United States Patent
Kumar et al.

(10) Patent No.: US 11,979,246 B2
(45) Date of Patent: May 7, 2024

(54) FACILITATING INTERACTION AMONG MEETING PARTICIPANTS TO VERIFY MEETING ATTENDANCE

(71) Applicant: Microsoft Technology Licensing, LLC, Redmond, WA (US)

(72) Inventors: Mamta Debnath Kumar, Redmond, WA (US); Madrina Thapa, Athens, GA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/958,096

(22) Filed: Sep. 30, 2022

(65) Prior Publication Data

US 2024/0113904 A1 Apr. 4, 2024

(51) Int. Cl.
  *G06Q 10/10* (2023.01)
  *G06Q 10/1093* (2023.01)
  *H04L 12/18* (2006.01)

(52) U.S. Cl.
  CPC ..... *H04L 12/1822* (2013.01); *G06Q 10/1095* (2013.01); *H04L 12/1818* (2013.01)

(58) Field of Classification Search
  CPC ......... H04L 12/02; H04L 12/16; H04L 12/18; H04L 12/1813; H04L 12/1818;
  (Continued)

(56) References Cited

U.S. PATENT DOCUMENTS

| 7,725,342 B2 * | 5/2010 | Keohane | ............. G06Q 10/109 |
| | | | 705/7.19 |
| 8,583,784 B2 * | 11/2013 | Beebe | .................. G06Q 10/109 |
| | | | 709/224 |

(Continued)

FOREIGN PATENT DOCUMENTS

KR 102159300 B1 9/2020

OTHER PUBLICATIONS

"Overview of Microsoft Graph," available at https://docs.microsoft.com/en-us/graph/overview, Microsoft Docs, Microsoft Corp., Redmond, WA, Jun. 14, 2022, 7 pages.

(Continued)

*Primary Examiner* — Boris D Grijalva Lobos

(57) ABSTRACT

A technique facilitates interaction among meeting participants for a purpose of verifying meeting attendance. The technique includes the operations of: using a programmatic interface to query a data structure to discover first information regarding meetings that a user is scheduled to attend; using the programmatic interface to query the data structure to discover second information regarding participants of a particular meeting; generating a likelihood measure, based on the second information, that specifies a likelihood that the particular meeting will take place; displaying the first information, second information, and a representation of the likelihood measure in a user interface presentation; generating and presenting a graphical control that invites the user to take a computer-implemented action pertaining to the particular meeting; and, in response to activation of the graphical control, performing the computer-implemented action. In some cases, the action involves sending an electronic message to at least one meeting participant.

20 Claims, 11 Drawing Sheets

(58) Field of Classification Search
CPC . H04L 12/1822; H04L 12/1831; G06Q 10/10; G06Q 10/109–1095
See application file for complete search history.

(56) References Cited

U.S. PATENT DOCUMENTS

| | | | |
|---|---|---|---|
| 10,798,208 | B2 | 10/2020 | Singh et al. |
| 11,144,886 | B2* | 10/2021 | Silva .................... G06F 16/3344 |
| 11,288,636 | B2 | 3/2022 | Zarakas et al. |
| 11,334,853 | B2 | 5/2022 | DeLuca et al. |
| 2009/0055236 | A1 | 2/2009 | O'Sullivan et al. |
| 2011/0252097 | A1 | 10/2011 | Walker et al. |
| 2013/0305169 | A1* | 11/2013 | Gold ........................ G09B 5/00 715/757 |
| 2014/0187213 | A1* | 7/2014 | Shuster ................ H04W 4/029 455/414.1 |
| 2016/0247125 | A1* | 8/2016 | Theisen ............. G06Q 10/1095 |
| 2017/0308866 | A1 | 10/2017 | Dotan-Cohen et al. |
| 2019/0005462 | A1* | 1/2019 | Brennan ............ G06Q 10/1095 |
| 2019/0303878 | A1* | 10/2019 | Megahed ........... G06Q 10/1095 |
| 2019/0354910 | A1* | 11/2019 | Escapa ............. G06Q 10/06312 |
| 2021/0224754 | A1* | 7/2021 | Zarakas .................... G06N 3/08 |
| 2022/0180328 | A1* | 6/2022 | Shetty ................ G06Q 10/1093 |
| 2023/0033104 | A1* | 2/2023 | Geddes .................. G06N 20/00 |
| 2023/0043224 | A1* | 2/2023 | Katou .................... G06Q 10/02 |
| 2023/0046881 | A1* | 2/2023 | Mishra .................... H04L 51/18 |

OTHER PUBLICATIONS

Horvitz, et al., "Coordinate: Probabilistic Forecasting of Presence and Availability," arXiv, Cornell University, arXiv:1301.0573 [cs.HC] [v1], Dec. 12, 2012, 10 pages.

Google Translation of Korean Patent Document KR102159300B1, available at https://patents.google.com/patent/KR102159300B1/en?oq=10-2159300, Google Patents, accessed on Sep. 24, 2022, 30 pages.

Espacenet biographical detail page for Korean Patent Document KR102159300B1, European Patent Office, accessed on Sep. 30, 2022, 1 page.

* cited by examiner

OVERVIEW OF OPERATION OF THE MEETING SYSTEM, CONTINUED

CONTINUED FROM FIG. 10

CAUSE THE DISPLAY DEVICE TO PRESENT A REPRESENTATION OF THE LIKELIHOOD MEASURE IN THE USER INTERFACE PRESENTATION.
1102

CAUSE THE DISPLAY DEVICE TO PRESENT A GRAPHICAL CONTROL IN THE USER INTERFACE PRESENTATION.
1104

IN RESPONSE TO ACTIVATION OF THE GRAPHICAL CONTROL BY THE PARTICULAR USER, PERFORM A COMPUTER-IMPLEMENTED ACTION PERTAINING TO THE PARTICULAR MEETING.
1106

(FOR EXAMPLE)

GENERATE A PROMPT THAT INVITES THE USER TO CONTACT A PARTICULAR PARTICIPANT OF THE PARTICULAR MEETING, AND CAUSE THE DISPLAY DEVICE TO PRESENT A REPRESENTATION OF THE PROMPT IN THE USER INTERFACE PRESENTATION.
1104'

IN RESPONSE TO ACTIVATION OF THE PROMPT BY THE USER, AUTOMATICALLY GENERATE AN ELECTRONIC MESSAGE TO THE PARTICULAR PARTICIPANT, AND CAUSE A COMMUNICATION SYSTEM TO SEND THE ELECTRONIC MESSAGE TO THE PARTICULAR PARTICIPANT.
1106'

FIG. 11

OVERVIEW OF OPERATION OF THE MEETING SYSTEM, 1202

CAUSE A DISPLAY DEVICE TO DISPLAY A USER INTERFACE PRESENTATION, THE USER INTERFACE PRESENTATION INCLUDING: A FIRST REGION FOR PRESENTING FIRST INFORMATION, A SECOND REGION FOR PRESENTING SECOND INFORMATION, AND A THIRD REGION FOR PRESENTING THIRD INFORMATION AND A GRAPHICAL CONTROL, THE FIRST INFORMATION DESCRIBING MEETINGS THAT A PARTICULAR USER IS SCHEDULED TO ATTEND WITHIN A PRESCRIBED PERIOD OF TIME, THE SECOND INFORMATION DESCRIBING PARTICIPANTS OF A PARTICULAR MEETING IDENTIFIED IN THE FIRST INFORMATION, THE FIRST INFORMATION AND THE SECOND HAVING BEEN OBTAINED BY QUERYING A CALENDAR DATA STRUCTURE VIA A PROGRAMMATIC INTERFACE, AND THE THIRD INFORMATION INCLUDING A REPRESENTATION OF A LIKELIHOOD MEASURE THAT SPECIFIES A LIKELIHOOD THAT THE PARTICULAR MEETING WILL TAKE PLACE, THE LIKELIHOOD MEASURE BEING GENERATED BY PROCESSING LOGIC BASED ON THE SECOND INFORMATION, AND THE GRAPHICAL CONTROL, UPON ACTIVATION, ENABLING THE PARTICULAR USER TO TAKE AN ACTION PERTAINING TO THE PARTICULAR MEETING.
1204

FIG. 12

FACILITATING INTERACTION AMONG MEETING PARTICIPANTS TO VERIFY MEETING ATTENDANCE

BACKGROUND

Recent events have caused major disruptions in workforces, resulting in the fact that many people now work from home. This phenomenon introduces many new technical challenges. For example, while a user may use available tools to effectively schedule and conduct and a meeting online, the user does not typically have the opportunity to physically encounter the participants of the meeting before the meeting takes place. This leaves the user uncertain as to whether the meeting will happen. Often, the concern proves justified, and the user is left waiting for a meeting that will not happen. To address, this problem, the user may engage in a tedious effort to reach one or more participants of the meeting beforehand, e.g., by telephone or by some other means of communication. Not only does this waste the user's time, but it is tedious for the user to perform all of the user interface actions that are required to interact with the communication participants. On an organizational level, such an ad hoc behavior on the part of many employees can waste a large amount of resources, including computing-related resources, network-related resources, power, etc. Further, the above ad hoc approach may not alleviate the user's concerns about whether a meeting will take place.

SUMMARY

The following description sets forth a technical solution that facilitates interaction among meeting participants for the purpose of verifying meeting attendance. Some implementations of the solution include the operations of: using a programmatic interface to query a data structure to discover first information regarding meetings that a particular user is scheduled to attend; using the programmatic interface to query the data structure to discover second information regarding participants of a particular meeting specified by the first information; generating a likelihood measure, based on the second information, that specifies a likelihood that the particular meeting will take place; displaying the first information, second information, and a representation of the likelihood measure in a user interface presentation; causing the display device to present a graphical control in the user interface presentation; and, in response to activation of the graphical control by the particular user, performing a computer-implemented action pertaining to the particular meeting.

In some implementations, the last two operations involve: generating and presenting a prompt that invites the particular user to contact a particular participant of the particular meeting; and, in response to activation of the prompt by the particular user, automatically generating an electronic message to the particular participant, and causing a communication system to send the electronic message to the particular participant.

The likelihood measure gives the end user insight as to whether the meeting will take place, reducing the need for the end user to engage in cumbersome and resource-intensive interaction actions in an attempt to reach the same conclusion. For instance, upon being assured that the meeting has a high likelihood of taking place, the user can dispense with the effort required to contact the participants of that meeting. In those cases in which the measure reveals that the meeting occurrence is more uncertain, the solution provides the user with tools, accessible via the user interface presentation, for taking action pertaining to the particular meeting, such as by sending prepopulated electronic messages to one or more of the meeting participants. These provisions reduce the amount of user interface actions that the particular user would need to perform to address concerns about a particular meeting under consideration.

According to another illustrative aspect, the user interface presentation that is presented incudes a first region for presenting the first information, a second region for presenting the second information, and a third region for presenting the representation of the likelihood measure and the graphical control. In some implementations, the third region also presents a summary of participant availability information. The combination of the first, second, and the representation of the likelihood measure, together with a portal to action-taking tools, reduces the amount of user interface actions that a user needs to perform to check whether a meeting will take place.

The above-summarized technology can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 10 and 11 together show a first process that explains one manner of operation of the meeting system of FIG. 1.

FIG. 12 shows a second process that explains another manner of operation of the meeting system of FIG. 1.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an illustrative meeting system for assisting a user in verifying whether an upcoming meeting will take place. Section B sets forth illustrative methods that explain the operation of the meeting system of Section A. Section C describes illustrative computing functionality that, in some implementations, is used to implement any aspect of the features described in Sections A and B.

A. Illustrative Meeting System

Figure 1:
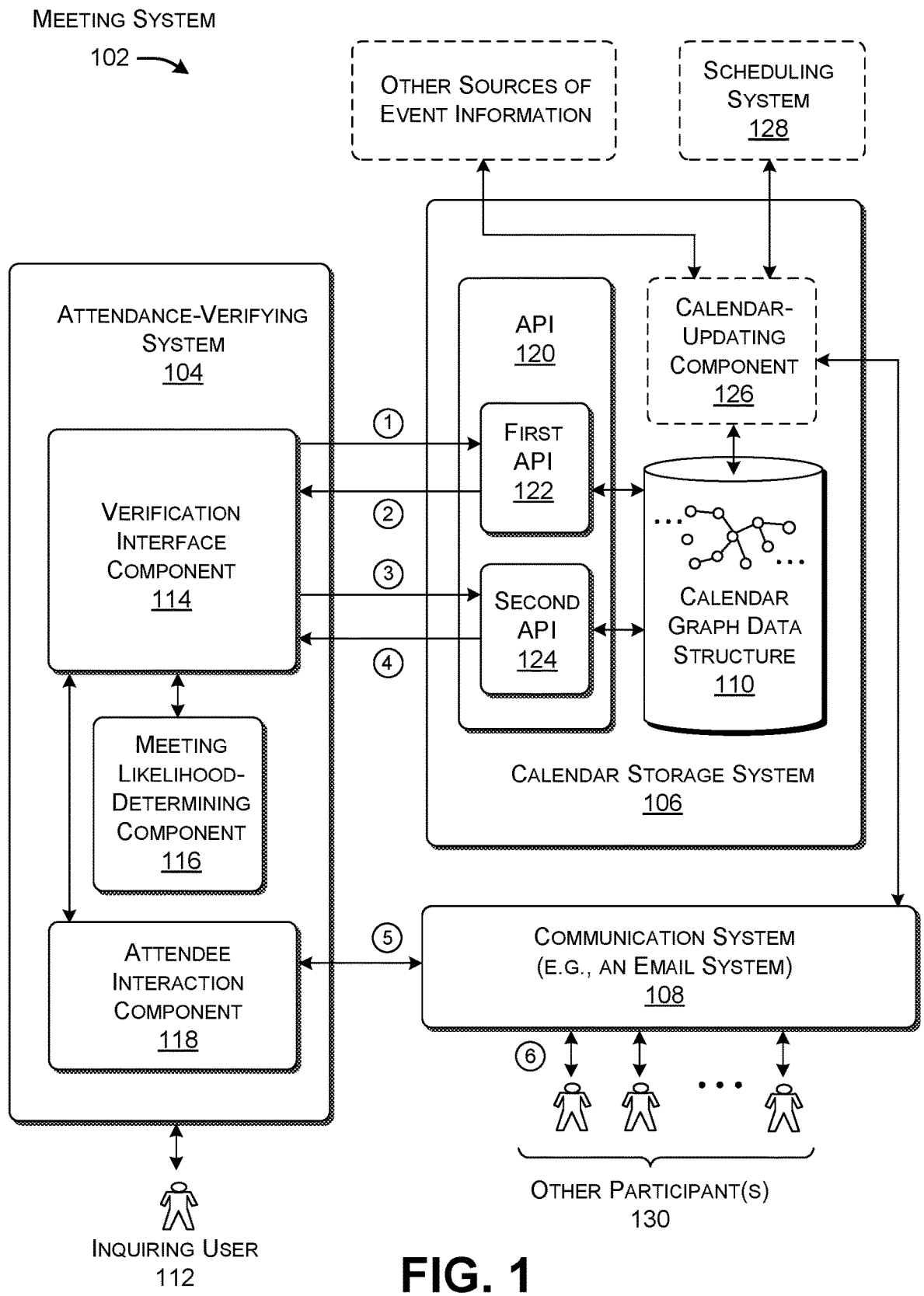
FIG. 1 shows one implementation of a meeting system for assisting a user in verifying attendance to a meeting.

FIG. 1 shows one implementation of a meeting system 102 for assisting a user in verifying attendance of a meeting. The meeting system 102 is particularly useful in verifying the attendance of online meetings, but can be used to verify the attendance of any kind of meeting, including meetings in which the participants meet in person. Overall, the meeting system 102 is designed to reduce the amount of user interface actions that are traditionally required to verify attendance of meetings, and to reduce the computing resources that are used to verify the attendance of meetings. The technique achieves this result, in part, by providing assurances regarding the likelihood that a meeting will occur. These assurances are difficult and costly to come by using a traditional ad hoc approach. Further, in cases in which a participant wishes to verify attendance of a meeting whose occurrence has been flagged as doubtful, the technique provides automated tools for facilitating interaction among meeting participants and/or performing other actions.

The meeting system 102 includes an attendance-verifying system 104 that interacts with a calendar storage system 106 and a communication system 108 (including one or more of an email system, a text messaging system, a video conferencing system, a social network application, etc.). The attendance-verifying system 104 includes logic used for verifying the attendance of meetings. The calendar storage system 106 stores information regarding meetings that have been scheduled using a calendar graph data structure 110. The calendar storage system 106 also stores information regarding the current status of each user who is registered to use to the meeting system 102.

In some implementations, the attendance-verifying system 104 operates in an on-demand manner based on requests of an inquiring user 112 (henceforth simply "user" 112). In some implementations, the user 112 is a member of an organization, such as a company, governmental agency, educational institution, non-profit entity, etc. Here, the user 112 uses the attendance-verifying system 104 to determine the likelihood that organizational meetings of which he or she is a participant are likely to occur. But the user 112 can use the attendance-verifying system 104 to verify the attendance of any meeting, including a meeting among the user's friends, family members, etc. Further, if given appropriate privileges, the user 112 is able to investigate meetings that a particular person (or persons) is (or are) scheduled to attend during a specified period of time, even though the user 112 may not be a participant in any of these meetings.

Figure 4:
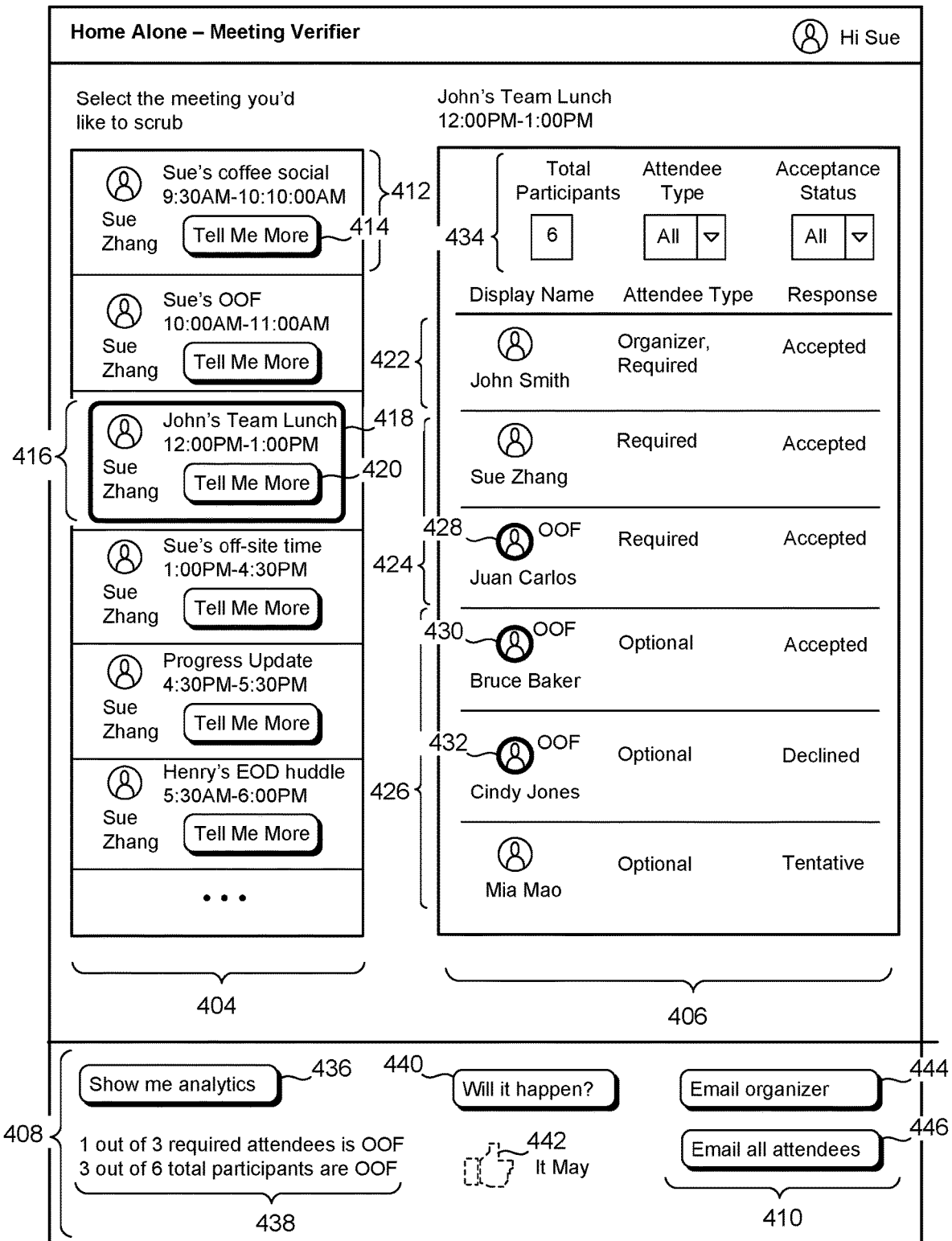
FIG. 4 shows a user interface presentation that the meeting system of FIG. 1 uses, in some implementations, to interact with the user.

The attendance-verifying system 104 includes a verification interface component 114, a meeting likelihood-determining component 116, and an attendee interaction component 118. The verification interface component 114 handles interaction with the calendar storage system 106. The verification interface component 114 also generates a user interface presentation for display on a display device. FIG. 4, to be described in turn, shows one implementation of the user interface presentation. The meeting likelihood-determining component 116 determines the likelihood that a meeting selected by the user 112 will take place. The attendee interaction component 118 automatically generates an electronic message when requested by the user 112. The attendee interaction component 118 also interfaces with the communication system 108 for the purpose of sending the electronic message and for receiving replies to the electronic message. To facilitate explanation, the following explanation will emphasize those scenarios in which the user 112 takes action via the attendee interaction component 118, e.g., by communicating with other meeting participants using the communication system 108. But more generally, the attendance-verifying system 104 can include any tool(s) for taking action regarding a meeting under consideration. These tools include, for instance, an interface to a scheduling system for canceling, rescheduling, or otherwise updating a meeting that is unlikely to occur. These scheduling operations involve a reduced number of user interface actions compared to a manual ad hoc approach.

The calendar storage system 106 hosts a programmatic interface that allows entities to interact with it. In the example of FIG. 1, the programmatic interface is an application programming interface (API) 120. The API 120 includes a first API 122 by which the user 112 asks for information regarding all the meetings that include the user 112 as a participant (or any other specified participant(s)) within a prescribed timeframe, such as the current day. This information is referred to herein as "first information." The API 120 includes a second API 124 by which the user 112 asks for information regarding an individual meeting selected by the user 112. This information is referred to herein as "second information."

The calendar storage system 106 includes a calendar-updating component 126 for updating the calendar graph data structure 110 based on event information provided by any of a range of sources. The calendar-updating component 126 collects this event information using any technique(s), including a push-based technique, a pull-based technique, etc. The calendar-updating component 126 also provides a permission user interface (not shown) that allows each end user to explicitly authorize or deny each data collection operation performed by the calendar-updating component 126. Data collection is explained below in the illustrative context in which the user 112 is the focus of inquiry; but the calendar-updating component 126 performs the same data collection operations with respect to every user who has authorized these operations.

A non-exhaustive list of possible sources of event information follows. In some implementations, the calendar-updating component 126 receives scheduling event information from a scheduling system 128. The scheduling system 128 represents any scheduling functionality, including any scheduling functionality provided by an Email application (e.g., the OUTLOOK application provided by Microsoft Corporation of Redmond, Washington), any video scheduling application (e.g., the TEAMS application provided by Microsoft), etc. In addition, or alternatively, the calendar-updating component 126 obtains user out-of-office (OOF) status information and/or available status information from the scheduling system 128. For instance, the calendar-updating component 126 receives OOF status information whenever the user 112 configures an Email application to send an OOF message upon receipt of an Email message directed to the user 112.

Alternatively, or in addition, the calendar-updating component 126 receives any user status information that indicates whether the user 112 is logged into his or her account provided by any host service that may or may not include an Email application. Such an account includes any of a Microsoft account (associated with Microsoft Corporation), a Google account (associated with Alphabet Inc. of Mountain View, California), any shopping service-related account, any social network site account, etc.

Alternatively, or in addition, the calendar-updating component 126 receives activity information from any kind of activity sensor that senses actions taken on a computing device or within a specified application, system, network, etc. For instance, the calendar-updating component 126 receives activity information from a typing sensor that indicates that the user 112 is currently typing on a computing device. Alternatively, or in addition, the calendar-updating component 126 receives activity information from an application that specifies that certain actions were taken within the application. Alternatively, or in addition, the calendar-updating component 126 receives activity information from a network sensor that reveals that the user 112 has taken actions using a specified network connection, and so on.

Alternatively, or in addition, the calendar-updating component 126 receives position information from any positioning system that reveals the current position of the user 112. The positioning systems include a global positioning system (GPS), a terrestrial wireless system (e.g., including a triangulation system), a distributed beacon-based positioning system, various rooms sensors, etc.

Alternatively, or in addition, the calendar-updating component 126 receives event information regarding events that are capable of impacting planned meetings. These events, while they are able to affect planned meetings, are generally more general in nature than the planned meetings themselves. For instance, the calendar-updating component 126 can receive event information from a news feed that indicates whether a building in which the user 112 has planned a meeting is closed, e.g., due to a power failure, weather-related disruption, or other unforeseen circumstance.

FIG. 1 is annotated with numbers in circles that denote respective actions performed by the meeting system 102. In operation (1), the verification interface component 114 asks the first API 122 of the calendar storage system 106 for all of the meetings that name a specified person(s) as an attendee, with respect to a specified period of time. For example, the verification interface component 114 can ask for all meetings in which the user 112 is a participant, with respect to the current day. In response to the request, the calendar storage system 106 accesses the requested information from the calendar graph data structure 110. In operation (2), the calendar storage system 106 sends the requested information to the verification interface component 114. The information that is requested and received in operations (1) and (2) is referred to herein as "first information." The verification interface component displays the first information in a first region of the user interface presentation. As used herein, reference to displaying information is to be considered synonymous with displaying a representation of the information.

In operation (3), the verification interface component 114 asks the second API 124 of the calendar storage system 106 for further details regarding a selected meeting(s) within the set of meetings summarized by the first information. In response to the request, the calendar storage system 106 accesses the requested information from the calendar graph data structure 110. In operation (4), the calendar storage system 106 sends the requested information to the verification interface component 114. As noted above, the information that is requested and received in operations (3) and (4) is referred to herein as "second information." The verification interface component 114 displays the second information in a second region of the user interface presentation.

In a next operation not annotated in FIG. 1, the verification interface component 114 uses the second information to calculate the likelihood that the meeting described by the second information will happen. The verification interface component then displays a representation of the measure of the likelihood (referred to below as a "likelihood measure") in a third region of the user interface presentation. The verification interface component 114 also presents a graphical control (or controls) in the third region by which the user 112 can interact with the other participant(s) 130 of the meeting described in the second region of the user interface presentation and/or perform other actions directed to a meeting (or meetings) under consideration.

In a next operation (not annotated in FIG. 1), assume that the user 112 interacts with the graphical control(s) in the third region, e.g., with the objective of sending an electronic message to the participant(s) 130 of the meeting shown in the second region. In response, the attendee interaction component 118 automatically generates an electronic message that is prepopulated with the contact information of the participant(s) 130 of the meeting under consideration. In some implementations, the electronic message also provides summary information that summarizes the second information requested from the calendar storage system 106. For instance, the summary information identifies the number of users who are out-of-office (OOF).

In operations (5) and (6), the attendee interaction component 118 and the communication system 108 interact to send the electronic message generated by the attendee interaction component 118 to the identified other participant(s) 130. The attendee interaction component 118 and the communication system 108 is also configurable to receive and present any response(s) from the participant(s) 130 to the electronic message.

The meeting system 102 can repeat the above-described series of operations any number of times, until the user 112 has fully investigated the day's events to his or her satisfaction. The meeting system 102 as a whole greatly reduces the amount of user interface actions that the user 112 needs to perform in aggregate. For instance, assume that over the course of any given week, the meeting system 102 works in the manner described above to inform the user 112 that five out of a total of 30 meetings will definitely not take place, and that the occurrence of another five out of the total of 30 meetings is assessed at only about 25 percent. In response, the user 112 will need only reach out to investigate a maximum of ten out of the total of 30 meetings. In one case, for example, the user 112 may assume that the meetings identified with zero probability will not take place. The user 112 may decide to proactively inform the participants of these five meetings that the user 112 will assume that these meetings will not occur. In contrast, the user 112 can send emails to the participants of the meetings having only a 25 percent chance of occurring to ask the participants to clarify their attendance (or non-attendance) to the meetings under consideration, or at least to proactively inform the participants that the meetings might not happen.

While the user interface presentation 402 gives the user 112 freedom to choose whether they will act to confirm any individual meeting, it is expected to reduce user interface actions required by the user 112 in all scenarios in which the user 112 seeks to take some action regarding future meetings that appear doubtful. For example, the user interface presentation 402 provides meeting likelihood information, and proximally couples this information with an interface to functionality to send a prepopulated message to meeting participant(s). This combination of features reduces the effort of the user 112 who wishes to confirm attendance to the meeting under consideration. For instance, it eliminates or simplifies the activities of activating the communication system 108, discovering the contact information of the participant(s) 130, and then typing the message. The message also contains information that empowers both the user 112 and the other participant(s) 130 to decide whether the meeting will take place; such a decision would, without the meeting system 102, require at least some interaction between the user 112 and the other participant(s) 130, as they sought to collect facts about the scheduled meeting and the expected availability of the attendees.

Figure 2:
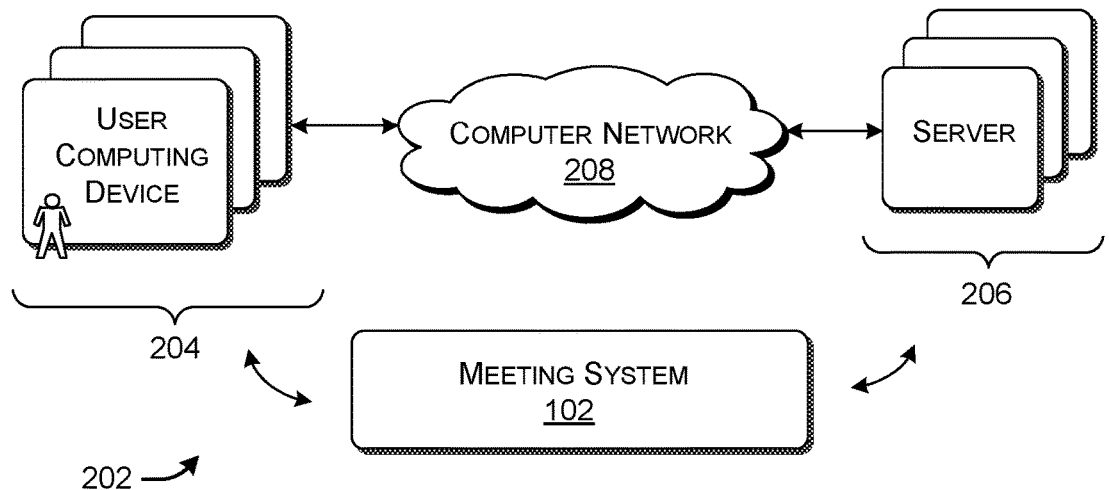
FIG. 2 shows equipment that, in some implementations, is used to implement the meeting system of FIG. 1.

FIG. 2 shows equipment 202 that, in some implementations, is used to implement the meeting system 102 of FIG. 1. The computing equipment 202 includes a set of user computing devices 204 coupled to a set of servers 206 via a computer network 208. In some implementations, each user computing device corresponds to any device that performs a computing function, including a desktop computing device, a laptop computing device, a handheld computing device of any type (e.g., a smartphone, or a tablet-type computing device), a mixed reality device, a wearable computing device, an Internet-of-Things (IoT) device, a gaming system, etc. In some implementations, the computer network 208 is implemented as a local area network, a wide area network (e.g., the Internet), one or more point-to-point links, or any combination thereof.

FIG. 2 also indicates that the functionality of the meeting system 102 is spread across the user computing devices 204 and/or the servers 206 in any manner. For instance, in some cases, one or more of the servers 206 implement the entirety of the meeting system 102. Here, the user 112 interacts with the meeting system 102 via a browser application or other programmatic interfaces provided by a user computing device. In other cases, the functionality of the meeting system 102 is implemented by both local and remote resources. For instance, in some implementations, a particular user computing device locally implements by the attendance-verifying system 104, while the servers 206 implement the calendar storage system 106. The same flexibility in implementation design extends to the communication system 108, the scheduling system 128, etc.

Figure 3:
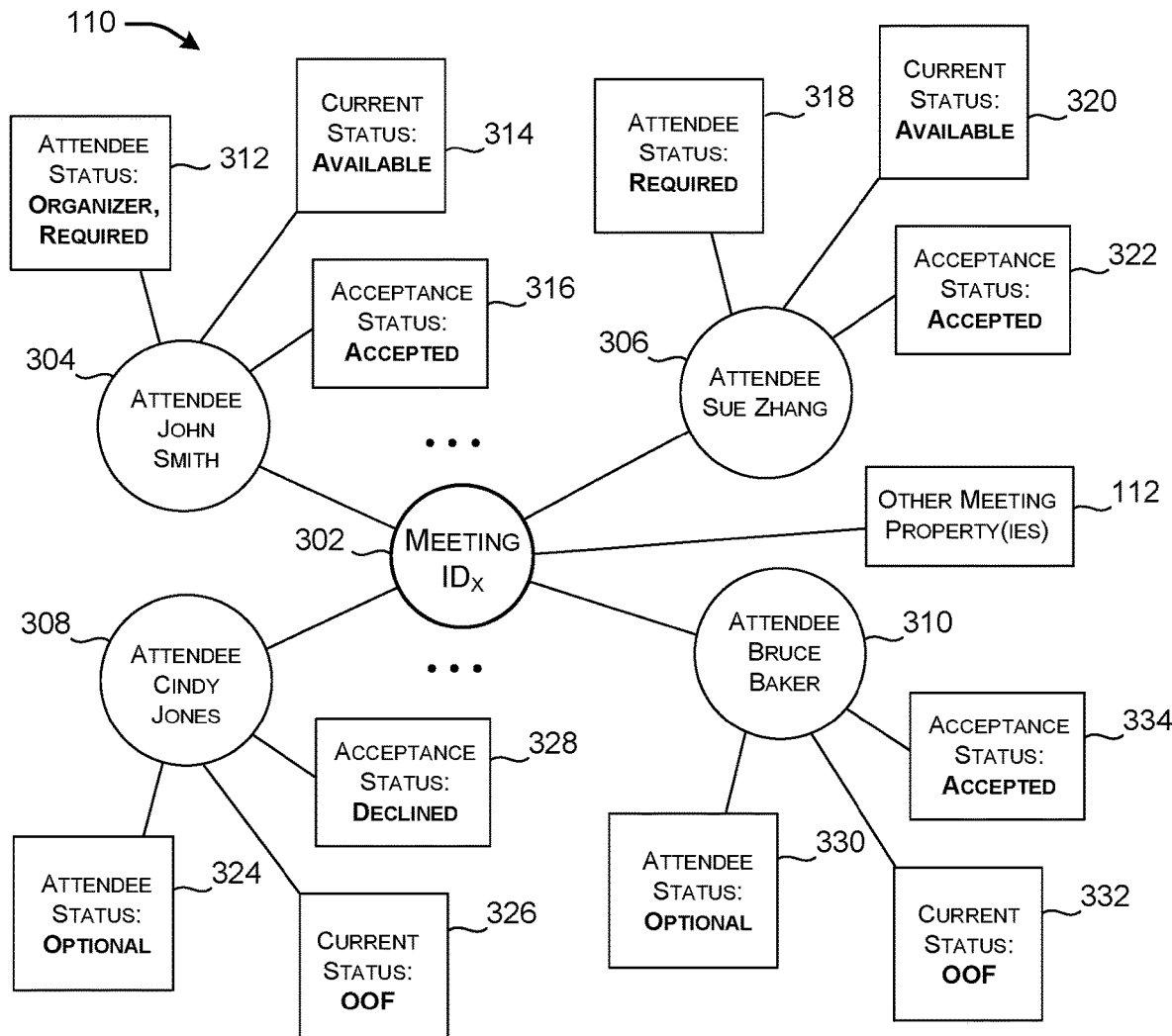
FIG. 3 shows a small representative sample of information maintained by a data structure with which the meeting system of FIG. 1 interacts.

FIG. 3 shows a small representative sample of information maintained by the calendar graph data structure 110 with which the meeting system 102 of FIG. 1 interacts. Generally, the calendar graph data structure 110 includes a plurality of nodes that represent entities (e.g., denoted by the circular nodes) and properties (e.g., denoted by the rectangular nodes). The calendar graph data structure 110 includes a plurality of edges that represent relationships among the entities and properties. The particular arrangement of nodes and edges shown in FIG. 3 is merely illustrative, and other implementations can use other connection strategies to express the relationships among entities and properties. Still other implementations use other kinds of data structures to express relationships among entities, besides a graph data structure.

More specifically, FIG. 3 shows some details regarding a scheduled meeting, associated with a meeting node 302, although not necessarily all of the details regarding the meeting. The meeting node 302 has plural participants represented by respective nodes, four nodes of which are shown in FIG. 1. That is, a node 304 is associated with an organizer and meeting participant John Smith. A node 306 is associated with a meeting participant named Sue Zhang. A node 308 is associated with a meeting participant named Cindy Jones. A node 310 is associated with a meeting participant named Bruce Baker. A property node 312 linked to John Smith's node 304 indicates that this participant has organized the meeting, and has been designated as a required participant, meaning that this person's presence is deemed as important to achieving the meeting's objectives. A property node 314 indicates that John Smith is currently available, while a property node 316 indicates that John Smith has accepted an invitation to the meeting. Similarly, property nodes (318, 320, 322) indicate that Sue Zhang is required, is available, and has accepted the invitation to the meeting. Property nodes (324, 326, 328) indicate that Cindy Jones is an optional attendee to the meeting, is currently OOF, and has declined the meeting. Property nodes (330, 332, 334) indicate that Bruce Baker is an optional attendee, is currently OOF, and has accepted the meeting. All of these information items play into a determination of whether the meeting will happen.

FIG. 4 shows an illustrative user interface presentation 402 that the verification interface component 114 presents to the user 112. The user 112 interacts with the meeting system 102 primarily through this user interface presentation 402. In the example of FIG. 4, the user interface presentation 402 presents information regarding meetings that a person named Sue Zhang is scheduled to attend. Further assume that Sue Zhang is the user 112 who interacts with the user interface presentation 402. But as previously noted, the user interface presentation 402 can more generally be said to present information regarding meetings that any participant or plural identified participants are scheduled to attend. Further, the person who interacts with the user interface presentation 402 need not be one of the participants of the meetings identified by the user interface presentation 402.

As will be described, the user interface presentation 402 includes various graphical controls that the user 112 is able to manipulate. The user 112 manipulates a graphical control, in turn, by interacting with any user input device, examples of which are described in Section C. For instance, one input device is a mouse device. Another input device is a touch-sensitive display screen, etc.

In the example of FIG. 4, each region of the user interface presentation 402 is a single cohesive and uninterrupted portion of the user interface presentation 402. In other implementations, a region includes spatially separate portions of the user interface presentation 402. Further, in the example of FIG. 4, the user interface presentation 402 is presented on a single page. But more generally, a user interface presentation encompasses any number of pages or other user interface elements.

In some implementations, the user interface presentation 402 includes three main regions. A first region 404 corresponds to a part of the user interface presentation 402 that is devoted to presenting the above-described first information, which provides a summary of the user's meetings that occur within a specified period of time (such as a current day). A second region 406 corresponds to another part of the user interface presentation 402 that presents the above-described second information pertaining to a selected meeting identified in the first region 404. A third region 408 corresponds to another part of the user interface presentation 402 that presents information regarding the likelihood that the meeting shown in the second region 406 will take place. The third region 408 also provides graphical controls 410 that allow the user 112 to confirm whether an identified meeting or meetings (such as the meeting identified in the second region

406) will take place and/or take other actions regarding the identified meeting or meetings (such as cancelling or rescheduling the meeting(s)).

The verification interface component 114 presents the first information in the first region in response to various triggering events. In some examples, the verification interface component 114 retrieves the first information from the calendar storage system 106 in response to the user 112 logging onto a service associated with the meeting system 102. The attendance-verifying component 104 then presents the first information in the first region 404 upon an explicit request by the user 112. Alternatively, the attendance-verifying system 104 will only retrieve the first information from the calendar storage system 106 upon an explicit request by the user 112 to display the user interface presentation 402.

In the merely illustrative case of the example shown in FIG. 4, the first region 404 shows summary information regarding six meetings that the user 112 (Sue Zhang) is scheduled to attend in the course of a current day, arranged from earliest to latest. Subregion 412 contains summary information regarding the first meeting of the day, e.g., by identifying the title of the meeting (or a portion of the title) and its starting and ending times. The subregion 412 also includes a graphical control 414 that the user 112 is able to activate to discover additional details regarding the first meeting.

In the example of FIG. 4, the user 112 moves the focus in the first region 404 to another subregion 416, corresponding to the third meeting of the day. A highlighting indicator 418 is presented that indicates that the user's focus is currently on the third meeting. The user 112 is able to advance the focus to a different day by touching a different day, or by clicking on a different day using a user interface control device (e.g., a mouse device), and so on. Alternatively, or in addition, the verification interface component 114 automatically advances the highlighting indicator to mark the current meeting of the day.

Assume that the user 112 next activates a graphical control 420 of the third meeting shown in subregion 416. This causes the second region 406 to present details of the third meeting. In some implementations, the user's activation of the graphical control 420 causes the verification interface component 114 to request the second information from the calendar storage system 106. Other implementations retrieve the second information in advance of the user's activation of the graphical control 420. For instance, other implementations automatically retrieve details regarding every meeting identified in the first region 404 after receipt of the first information. In these alternative implementations, the verification interface component 114 stores the second information in a local memory, and displays the second information when explicitly requested by the user 112.

The second region 406 includes a listing of the participants of the third meeting, including participants named John smith (the organizer of the meeting), Sue Zhang (a required participant), Juan Carlos (a required participant), Bruce Baker (an optional participant), Cindy Jones (a required participant), and Mia Mao (an optional attendee). In some implementations, the verification interface component 114 arranges the participants in an order in which the organizers are presented at the top of the list (e.g., in subregion 422), the required participants are presented next (e.g., in subregion 424), and the optional participants are presented next (e.g., in subregion 426). The listing in the second region 406 specifies the name of each participant, his or her type (e.g., required or optional), and his or her response to the meeting invitation for the meeting (e.g., accepted, or declined, or tentative). The listing also presents indicators (e.g., indicators 428, 430, 432) to indicate that three of the six participants have the status of OOF.

In some implementations, the verification interface component 114 also provides summary information based on the second information. In some cases, the summary information is already present in the second information itself. In other cases, the verification interface component 114 applies its own logic to generate summary information based on information specified by the second information. In still other cases, the verification interface component 114 relies on the meeting likelihood-determining component 116 to generate the summary information based on the second information.

More specifically, the verification interface component 114 determines the total number of participants of the meeting using any of the above approaches. The verification interface component 114 then displays the total number of participants in a subregion 434 of the second region 406. The subregion 434 optionally also includes one or more graphical controls that enable the user 112 to filter the second information in any desired manner. For instance, a first graphical control in the subregion 434 allows the user 112 to filter the second information by attendee type. A second graphical control in the subregion 434 allows the user 112 to filter the second information by acceptance status, and so on.

The third region 408 includes a graphical control 436 (reading "show me analytics"). Activation of this graphical control 436 causes the verification interface component 114 to present summary information 438 compiled from the second information that specifies that one out of three required attendees to the third meeting will be OOF, and that three out of a total of six participants are OOF. The verification interface component 114 calculates this summary information itself using its own logic, and/or it calls on the logic provided by the meeting likelihood-determining component 116 to perform this calculation. In other implementations, the verification interface component 114 automatically displays the summary information 438 at the same time that the second information is accessed and then presented in the second region 406.

The third region 408 also includes a graphical control 440 (reading "Will it happen?"). Activation of this graphical control 440 causes the verification interface component 114 to present an indicator 442 that specifies that the meeting shown in the second region 406 may happen. The verification interface component 114 displays this indicator 442 after coming to the conclusion that the meeting has about a 50 percent chance of occurring. The verification interface component 114 can reach this conclusion, in turn, based on analysis that its own logic performs, and/or based on analysis performed by the meeting likelihood-determining component 116. More specifically, in some implementations, the verification interface component 114 automatically determines the meeting likelihood in response to the user 112 activating the graphical control 440. In other implementations, the verification interface component 114 automatically generates the meeting likelihood after the second information is retrieved, without requiring the user 112 to activate the graphical control 440. In this latter scenario, some implementations of the user interface presentation 402 omit the graphical control 440.

The third region 408 also includes another graphical control 444 ("Email organizer"). (Note that in those cases in which the user 112 is the meeting organizer, then the verification interface component 114 will omit the presentation of the graphical control 444.) In response to activation of this graphical control 444, the verification interface component 114 and the attendee interaction component 118 interact to generate a prepopulated electronic message to the organizer(s) of the meeting (here, the participant named John Smith). Upon approval from the user 112 of the electronic message, the attendee interaction component 118 and the communication system 108 work together to send the electronic message to the meeting organizer(s). The electronic message sent to the organizer(s) may include the summary information 438 and the indicator 442. In most cases, the purpose of the electronic message is to inform the organizer(s) that a meeting will potentially not take place, and allow the organizer(s) to take appropriate action in response to this information. In some implementations, the electronic message also includes an explicit or implicit suggestion to the meeting organizer(s) to inform all of the participants that the meeting will not take place, if fact the meeting organizer(s) confirms that the meeting will not take place.

The third region also includes another graphical control 446. In response to activation of this graphical control 446, the verification interface component 114 and the attendee interaction component 118 interact to generate a prepopulated electronic message to all of the participants of the meeting, or just the required participants, or just the required participants of the meeting for the case in which the total number of participants is larger than a prescribed number (such as ten participants). Upon approval from the user 112 of the electronic message, the attendee interaction component 118 and the communication system 108 work together to send the electronic message to the specified participants. In some examples, the electronic message sent to each participant includes the summary information 438 and the indicator 442. In most cases, the purpose of the electronic message is to inform the participant that a meeting will not take place, and allow the participant to take corrective actions. In some implementations, the electronic message also includes an explicit or implicit request for the participant to verify whether the participant will attend the meeting by sending a return electronic message to the user 112 and/or the meeting organizer(s).

In some implementations, the meeting system 102 also encompasses functionality for automatically removing meetings from one or more schedules. For example, assume that Sue Zhang performs the same steps described above for the last meeting of the day. The meeting system 102 reveals that the meeting likelihood is zero percent, and thus the meeting system 102 concludes that the meeting will most likely not happen. At this juncture, the meeting system 102 can proactively cancel the meeting and notify the participants of the cancelation, rather than relying on Sue Zhang to send Email messages to the participants. The meeting system 102 is also configurable to automatically remove the meeting from the respective individual schedules of the participants of the meeting. To function in this manner, all of the participants of the meeting would have assented to the enhanced administrative capabilities described above, e.g., in a prior authorization step. Automatic manipulation of a user's schedule is technically advantageous because it reduces the amount of user interface actions that a user must perform to achieve the same results. Further, automatic removal of meetings achieves a more reliable and consistent result compared to manual manipulation of a schedule.

There are several possible variations of the above-described cancelation operation. In one variation, the meeting system 102 cancels a meeting upon concluding that it likely will not happen, without even the triggering circumstance of any participant generating a likelihood measure for the meeting under consideration. In another variation, the meeting system 102 notifies the meeting organizer that a meeting will most likely not take place. The meeting system 102 thereafter relies on the organizer to take initiative and cancel the meeting, which he or she has the authority to do. The organizer then is expected to notify the participants of the cancelation. In another variation, the meeting system 102 performs a voting operation in response to a conclusion that a meeting will likely not happen, in which participants are asked to vote whether the meeting should be canceled. In response to some prescribed percent of the participants voting for cancelation, the meeting system 102 then automatically removes the meeting from the schedules of the participants. Still other variations are possible.

Other implementations can vary the user interface presentation of FIG. 4 in plural ways and combinations of ways. For instance, other implementations can vary one or more of: a) a number of pages over which the information shown in FIG. 4 is presented; b) an arrangement of the information, compared to that shown in FIG. 4; c) the scope of the time frame and/or the scope of participants for which information is presented; d) the triggering circumstances in which the information shown in FIG. 4 is presented; e) the number of meetings for which likelihood measures are presented; f) that timing at which the likelihood measure(s) are calculated; g) the type of tools that are made available to the user 112; h) the type(s) of actions that are taken based on the likelihood measure(s) that are calculated, and so on.

Figure 5:
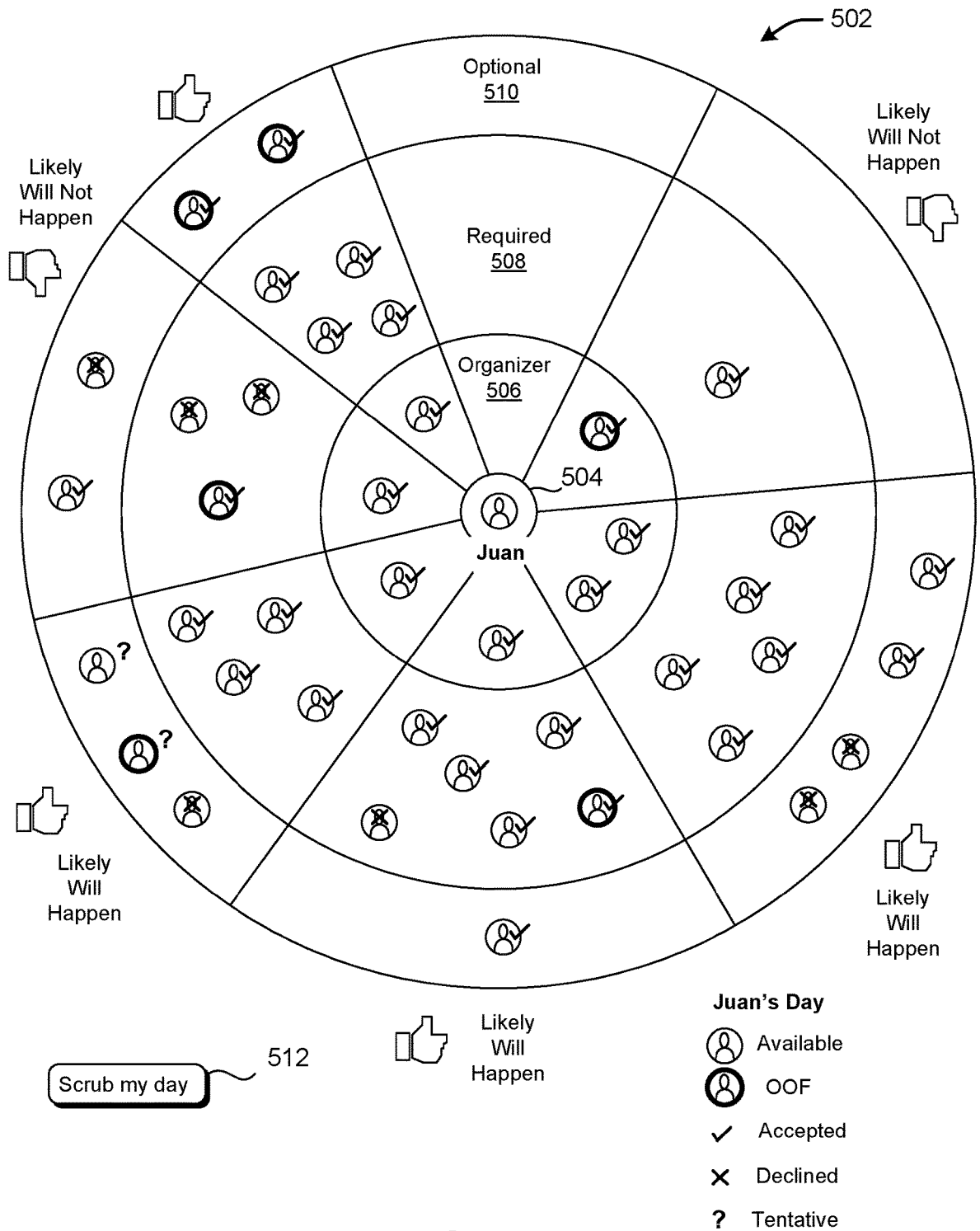
FIG. 5 shows another user interface presentation that the meeting system of FIG. 1 uses, in some implementations, to interact with the user.

FIG. 5 shows another illustrative user interface presentation 502 that the verification interface component 114 is able to present to the user 112, here a person named Juan Carlos, upon the user's request or other triggering event. The user interface presentation 502 uses a pie chart format to present information pertaining to all of the meetings that include Juan as a participant, and that occur in a prescribed span of time, such as a day. Each slice of the pie chart corresponds to a meeting that occurs in the prescribed span of time.

Concentric rings of the pie chart are associated with respective groups of participants having different roles. For instance, an inner-most ring 504 of the pie chart includes a symbol associated with Juan, the user who is performing the inquiry. A next ring 506 of the pie chart shows organizers of the meetings. A next ring 508 of the pie chart shows participants of the meetings having the status of "required." A next, outermost, ring 510 of pie chart shows participants of the meeting having the status of "optional."

Each participant of a meeting within a particular slice of the pie chart is denoted by a symbol associated with the participant. The verification interface component 114 also annotates each symbol associated with a participant with one or more indicators. As shown in the key to this figure, a check mark indicates that the participant has accepted the meeting. An X symbol indicates that the participant has declined the meeting. A question mark ("?") indicates that the participant has indicated that his or her acceptance is tentative. An OOF indicator specifies that the participant has the status of "out of office," and so on.

The verification interface component 114 also presents an indicator next to the outmost ring of each slice of the pie chart. This indicator conveys the likelihood measure associated with this slice of the pie chart and the meeting associated therewith. Thus, as a whole, FIG. 5 allows the user 112 to immediately grasp the subgroup of meetings during the day which are likely not going to occur. This, in turn, allows the user 112 to take the remediate actions described above, such as by contacting the participants of those meetings and inquiring whether these participants plan to attend. Although not shown, in some implementations, the user interface presentation 502 also provides graphical controls that allow the user to send prepopulated messages to the participants of a selected meeting, or perhaps all meetings having a prescribed likelihood assessment (such as all meetings that have a 50 percent or less chance of occurring).

In some implementations, the verification interface component 114 also presents a global graphical control 512 ("Scrub my day"). Upon activating this graphical control 512, the verification interface component 114 removes all meetings from the user's schedule for the day having a prescribed status, or any of a group of specified statuses. In some examples, the user 112 configures the verification interface component 114 to remove all meetings having a zero chance of occurring. The attendance-verifying system 104 also works with the communication system 108 to generate and send electronic messages to the participants of the meetings that are being canceled. The meeting system 102 is also configurable to automatically remove the meetings from the schedules of the other participants. To function in this manner, the participants would have assented to the cancelation behavior described above, in a prior authorization step.

As a general point, the meeting system 102 is able to reduce the number of user interface actions that are required over the aggregate because it provides a unified portal for making and acting on meeting decisions. Without the use of the unified portal, the user 112 would be forced to hunt for different functions provided by different hosting applications. A particularly useful element of the portal is the evaluation as to whether a meeting will take place. Without this automated evaluation, the user 112 is operating in the metaphorical dark. The user 112 would be forced to make an ad hoc decision, or conduct a tedious canvassing of the meeting participants to reach a conclusion. In the present system, the user 112 may decide to contact the participants in only those cases in which the meeting appears doubtful. And even in this circumstance, the portal greatly facilitates the user's contact efforts by providing quick access to the communication system 108, and by automatically generating a prepopulated electronic message.

Figure 6:
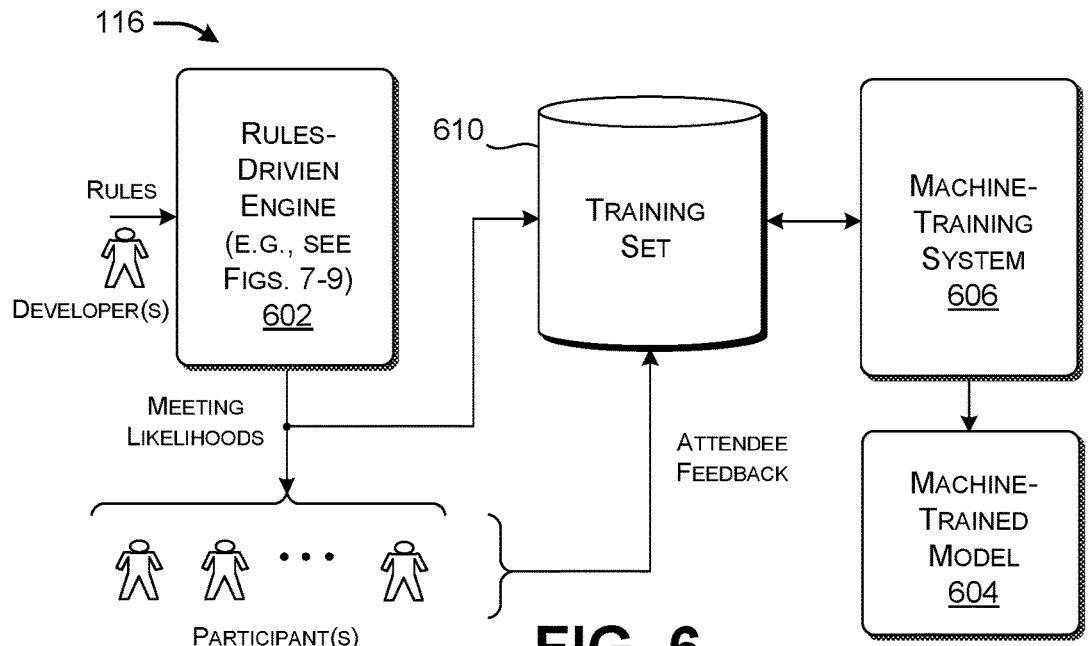
FIG. 6 shows one implementation of logic that the meeting system of FIG. 1 uses to generate the measure.

FIG. 6 shows one implementation of the meeting likelihood-determining component 116. In some implementations, the meeting likelihood-determining component 116 uses a rules-driven engine 602 to determine the likelihood measures. The rules-driven engine 602 is made up of a collection of rules, e.g., as explicitly defined by a developer or team of developers or any other entity(ies). In other implementations, the meeting likelihood-determining component 116 uses a machine-trained model 604 to generate the likelihood measures. A machine-training system 606 trains the machine-trained model 604 based on training examples provided in a data store 608. The machine-trained model 604 corresponds to any type of model or combination of models, including a linear regression model, a transformer-based classification model; a decision tree model; a random forest model; a Bayesian analysis model; a convolutional neural network (CNN)-based model, and so on.

In the specific example of FIG. 6, the attendance-verifying system 104 uses the rules-driven engine 602 in an initial phase of deployment. This produces training examples. For instance, assume that the rules-driven engine 602 determines that a meeting has a zero chance of occurring, and asks a participant to confirm the correctness of this conclusion. A negative example is created in those situations in which the end-user specifies that the probability of occurrence is not zero. Or a negative example may be implied in those cases in which the meeting still occurs. A positive example is created in those situations in which a participant explicitly identifies the rules-driven engine's recommendation as being correct. Or a positive training example is implied in those cases in which the meeting does not occur. The machine-training system 606 continually updates the trained weights of the machine-trained model 604 based on new training examples added to the data store 610.

In a second phase, upon concluding that prescribed training objectives have been achieved, the attendance-verifying system 104 begins its production-stage use of the machine-trained model 604. In some implementations, the attendance-verifying system 104 discontinues the use of the rules-driven engine 602. In other implementations, the attendance-verifying system 104 operates the rules-driven engine 602 in parallel with the machine-trained model 604. In some implementations, the attendance-verifying system 104 uses the machine-trained model 604 unless the confidence of any individual prediction is below a prescribed threshold value; if so, then the attendance-verifying system 104 uses the conclusion of the rules-driven engine 602. In other implementations, the attendance-verifying system 104 uses results of the rules-driven engine 602 to verify the accuracy of the machine-trained model 604, and vice versa. Upon disagreement between the conclusions, the attendance-verifying system 104 chooses the most conservative conclusion or the conclusion with the highest level of confidence (depending on how the attendance-verifying system 104 is configured). In still other cases, the attendance-verifying system 104 reports the results of both the rules-driven engine 602 and the machine-trained model 604, and so on.

The machine-training system 606 itself uses any training technique to train the machine-trained model 604, such as back propagation in combination with the stochastic gradient descent. From a high-level perspective, the machine-training system 606 attempts to maximize those occasions in which the machine-trained model 604 predicts the same results as the ground-truth results established by the training examples, and/or minimize those occasions in which the predictions of the machine-trained model 604 differ from the ground truth results.

Figure 7:
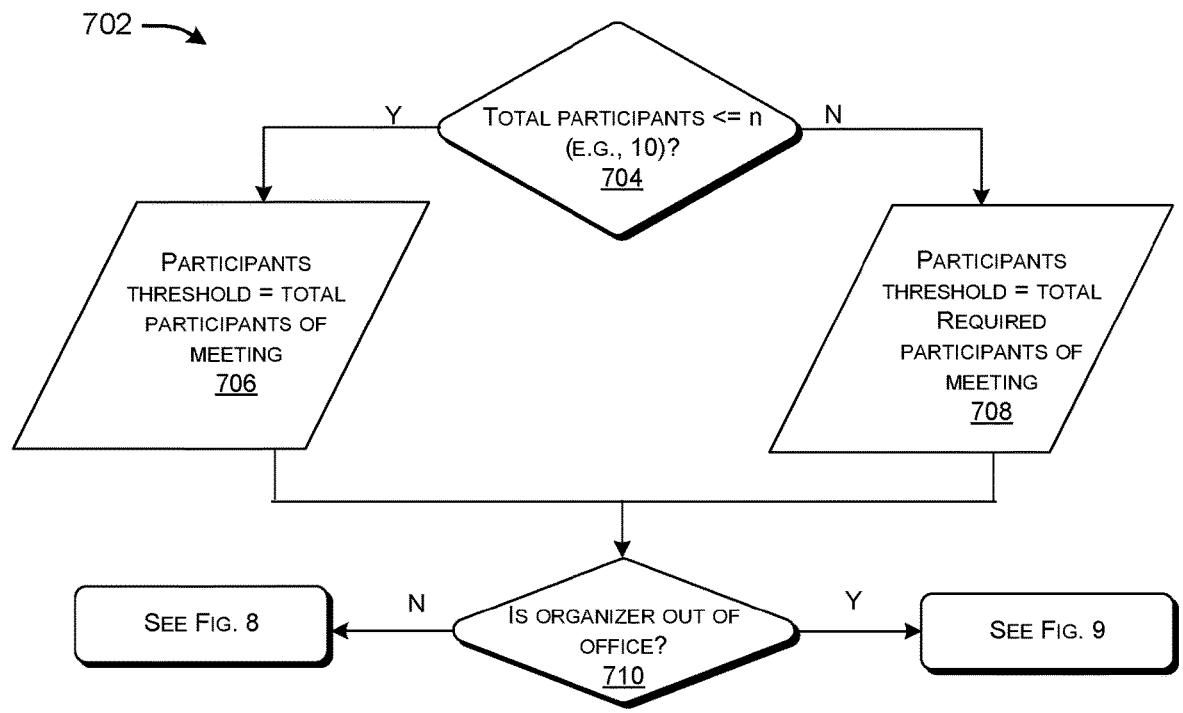
FIGS. 7-9 together show one implementation of processing logic that the meeting system of FIG. 1 uses to determine the measure of likelihood that a particular meeting will take place.
Figure 8:
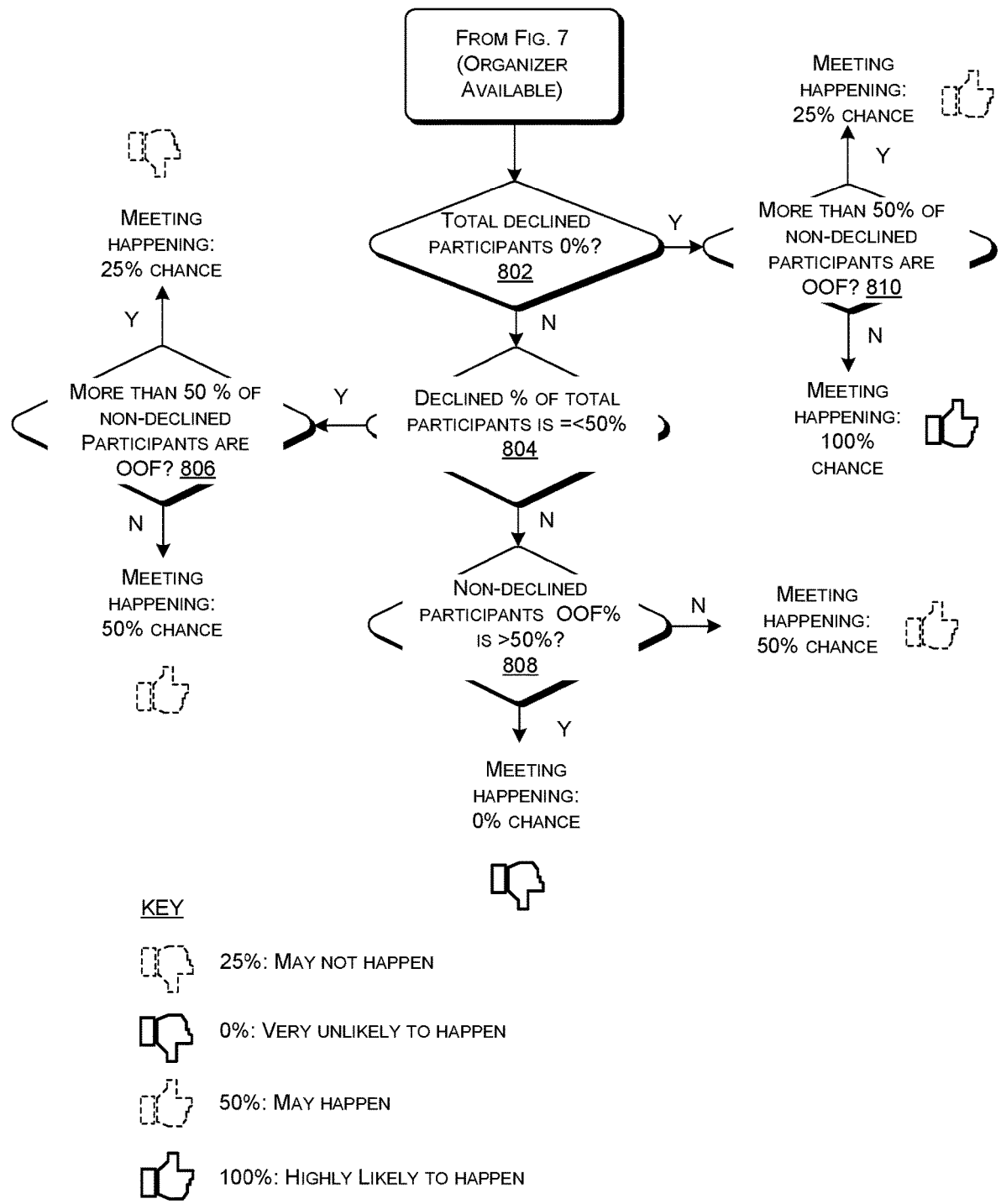
Figure 9:
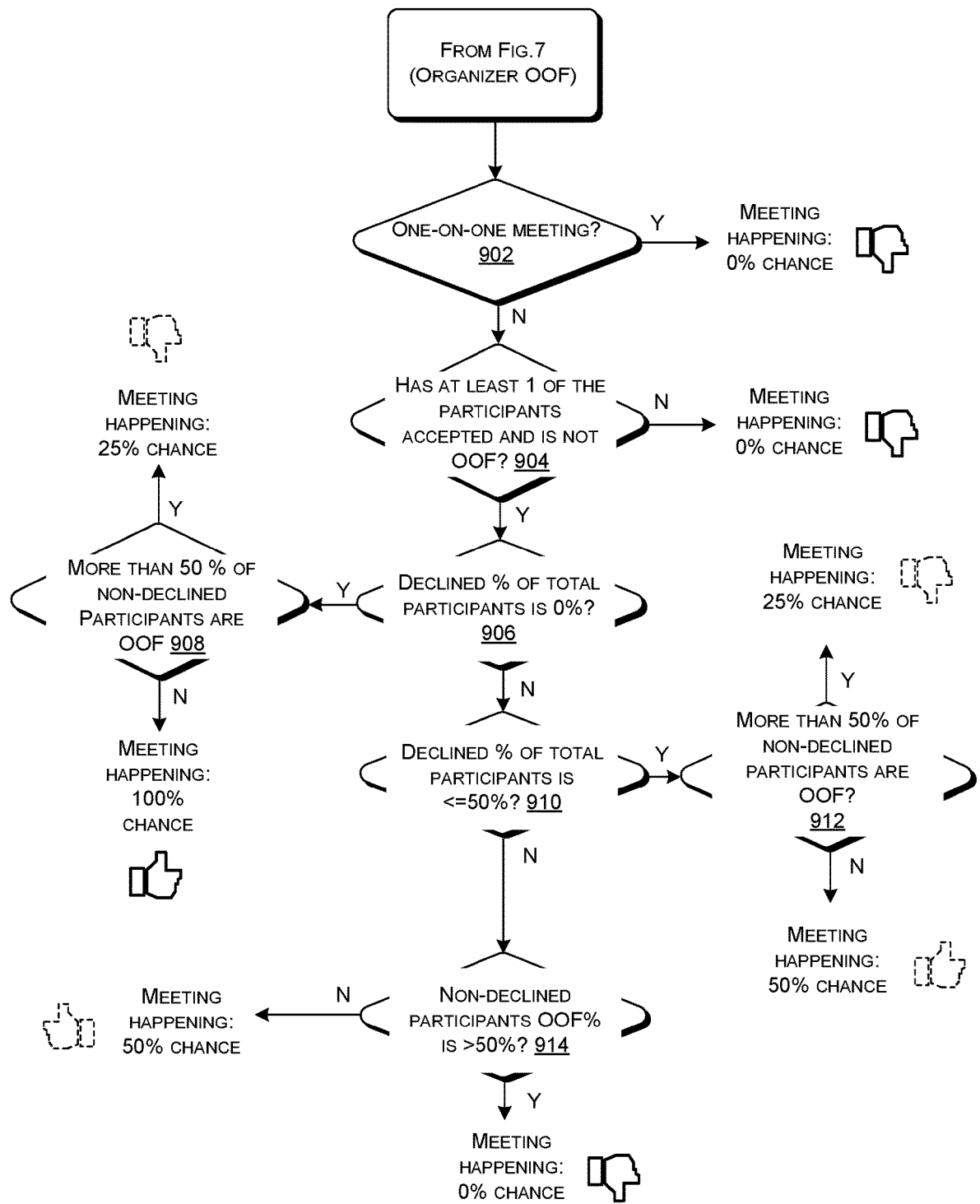

FIGS. 7-9 show rules 702 that together provide one implementation of the rules-driven engine 602. Other implementations can vary any aspect of the rules, including the choice and/or organization of operations, the choice of specific thresholds, etc. Starting with FIG. 7, in block 704, the rules-driven engine 602 determines whether the total number of participants to the meetings is equal to or smaller than a prescribed environment-specific number, such as 10 participants. The results of this decision determine the relevant pool of participants that are to be considered in the subsequent blocks of the analysis. For instance, per block 706, if there are ten or less total participants, then the subsequent processing blocks will take into consideration all of the participants, including the required participants and the optional participants. Per block 708, if there are more than 10 participants, then the subsequent analysis by the rules-driven engine 602 only takes into consideration the required participants of the meeting.

In block 710, the rules-driven engine 602 determines whether all of the organizers of the meeting under consideration are OOF. If so (Y), then the rules-driven engine 602 advances to the analysis of FIG. 8. If not (N), then the rules-driven engine 602 advances to the analysis of FIG. 9.

In block 802 of FIG. 8, the rules-driven engine 602 determines whether the total participants who have declined the meeting is zero percent. If this block (802) is answered in the negative (N), then, in block 804, the rules-driven engine 602 determines whether the declined percentage of participants is equal to or less than or equal to 50 percent. If this block (804) is answered in the affirmative (Y), then, in block 806, the rules-driven engine 602 determines whether the percentage of non-declined participants that are OOF is more than 50 percent. In some implementations, a "non-declined" participant is a participant who has accepted or indicated tentative attendance to the meeting under consideration. If this block (806) is answered in the affirmative (Y), then the rules-driven engine 602 concludes that the chances of the meeting happening are 25 percent. If this block (806) is answered in the negative (N), then the rules-driven engine 602 concludes that the chances of the meeting happened is 50 percent.

If block 804 is answered in the negative (N), then, in block 808, the rules-driven engine 602 determines whether more than 50 percent of the non-declined participants are OOF. If this block (808) is answered in affirmative (Y), then the rules-driven engine 602 concludes that there is a zero percent chance of the meeting happening. If this block (808) is answered in the negative (N), then the rules-driven engine 602 concludes that there is a 50 percent chance of the meeting happening.

If block 802 is answered in the affirmative (Y), then in block 810, the rules-driven engine 602 determines whether more than 50 percent of the non-declined participants are OOF. If this block (810) is answered in the affirmative (Y), then the rules-driven engine 602 concludes that there is a 25 percent chance of the meeting proceeding. If this block (810) is answered in the negative (N), then the rules-driven engine 602 concludes that there is a 100 percent chance of the meeting happening.

Advancing to FIG. 9, for the case in which the organizer(s) are OOF, in block 902, the rules-driven engine 602 determines whether the meeting under consideration is a one-on-one meeting. If so (Y), then the rules-driven engine 602 concludes that there is a zero percent chance of the meeting proceeding. If not (N), the rules-driven engine 602 advances to block 904, in which the rules-driven engine 602 asks whether there is at least one of the participants who accepted and is not OOF. If this block (904) is answered in the negative (N), then the rules-driven engine 602 again concludes that there is a zero percent chance of the meeting proceeding. If this block (904) is answered in the affirmative (Y), then analysis advances to block 906.

In block 906, the rules-driven engine 602 determines whether the declined percentage of total participants is zero percent. If this block (906) is answered in the affirmative, then, in block 908, the rules-driven engine 602 determines whether more than 50 percent of the non-declined participants are OOF. If so (Y), then the rules-driven engine 602 concludes that there is a 25 percent chance of the meeting proceeding. If not (N), then the rules-driven engine 602 concludes that there is a 100 percent chance of the meeting happening.

If block 906 is answered in the negative (N), then, in in block 910, the rules-driven engine 602 determines whether the declined percent of total participants is less than or equal to 50 percent. If so (Y), then in block 912, the rules-driven engine determines whether more than 50 percent of the non-declined participants are OOF. If so (Y), then the rules-driven engine 602 concludes that there is a 25 percent chance of the meeting proceeding. If not (N), then the rules-driven engine 602 concludes that there is a 50 percent chance of the meeting proceeding.

If block 910 is answered in negative (N), then, in block 914, the rules-driven engine 602 determines whether the percentage of non-declined participants that are OOF is greater than 50 percent. If so (Y), then the rules-driven engine 602 concludes that there is a zero percent chance of the meeting proceeding. If not (N), then the rules-driven engine 602 concludes that there is a 50 percent chance of the meeting proceeding.

To repeat, all decisions made in FIGS. 8 and 9 are with respect to the pools of participants defined in FIG. 7. That is, if there is there are more than n participants, then the rules-driven engine 602 only takes into consideration the required participants when answering the tests of FIGS. 7 and 9. If there is less or equal to n participants, then the rules-driven engine 602 also takes into consideration the optional participants. One way to implement the above-described rules is using a series of IF-THEN computer instructions.

The specific rules described above in FIG. 7-9 are chosen for use in a particular organization having particular objectives. Other organizations may find that another set of rules is appropriate for their respective environments and objectives. Hence, the reader will appreciate that no rule set forth in FIGS. 7-9 defines a hard conclusion that necessarily applies across different environments (although it may apply to many environments). For instance, other implementations can address the case of a tentative status in different ways. Further, an administrator and/or end user can be given the ability to choose among rule settings, e.g., via a configuration interface.

The machine-trained model 604 does not use the type of explicit rules shown in FIGS. 7-9. But the machine-trained model 604 incorporates machine-trained weights that approximate the collective conclusions of the rules in FIGS. 7-9. The machine-trained model 604 receives input information that defines: the number of required participants to a meeting; the number of optional attendees to the meeting; the numbers of required participants who have accepted the meeting, declined the meeting, and specified tentative attendance to the meeting; the numbers of optional participants who have accepted and declined the meeting; the numbers of required participants who are OOF, and the numbers who are available; and the numbers of optional participants who are OOF, the numbers who are available, and so on. The machine-trained model 604 maps this input information to a likelihood measure that conveys whether the meeting under consideration will (or will not) take place.

B. Illustrative Processes

Figure 10:
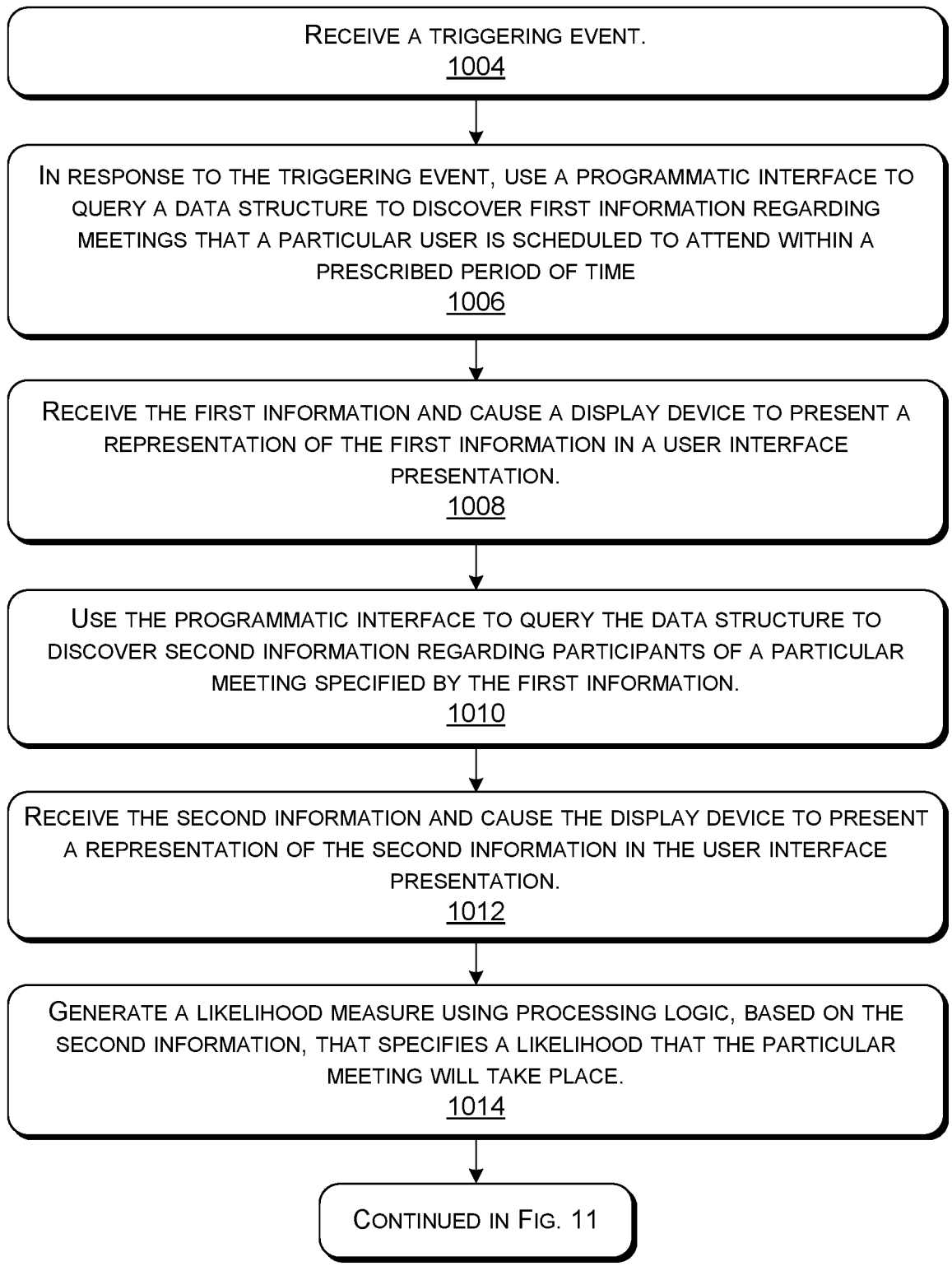

FIGS. 10-12 show illustrative processes that explain one manner of operation of the meeting system 102 of Section A in flowchart form. Since the principles underlying the operation of the meeting system 102 have already been described in Section A, certain operations will be addressed in summary fashion in this section. Each flowchart is expressed as a series of operations performed in a particular order. But the order of these operations is merely representative, and can be varied in other implementations. Further, any two or more operations described below can be performed in a parallel manner. In one implementation, the blocks shown in the flowcharts that pertain to processing-related functions can be implemented by the hardware logic circuitry described in Section C, which, in turn, can be implemented by one or more processors and/or other logic units that include a task-specific collection of logic gates.

FIGS. 10 and 11 together shows a method (e.g., 1002) for facilitating interaction among meeting participants. In block 1004 of FIG. 10, the meeting system 102 receives a triggering event. In block 1006, in response to the triggering event, the meeting system 102 uses a programmatic interface (e.g., 120) to query a data structure (e.g., 110) to discover first information regarding meetings that a particular user (e.g., 112) is scheduled to attend within a prescribed period of time. In block 1008, the meeting system 102 receives the first information and causes a display device to present the first information in a user interface presentation (e.g., 402). In block 1010, the meeting system 102 uses the programmatic interface to query the data structure to discover second information regarding participants of a particular meeting specified by the first information. In block 1012, the meeting system 102 receives the second information and causes the display device to present the second information in the user interface presentation. In block 1014, the meeting system 102 generates a likelihood measure using processing logic, based on the second information, that specifies a likelihood that the particular meeting will take place.

In block 1102 of FIG. 11, the meeting system 102 causes the display device to present a representation of the likelihood measure in the user interface presentation. In block 1104, the meeting system 102 causes the display device to present a graphical control in the user interface presentation. In block 1106, in response to activation of the graphical control by the particular user, the meeting system 102 performs a computer-implemented action pertaining to the particular meeting.

FIG. 11 also shows blocks 1104' and 1106' that respectively summarize one implementation of blocks 1104 and 1006. In block 1104', the meeting system 102 generates a prompt (e.g., 446) that invites the particular user to contact a particular participant of the particular meeting, and causes the display device to present the prompt in the user interface presentation. In block 1106', in response to activation of the prompt by the particular user, the meeting system 102 automatically generates an electronic message to the particular participant, and causes a communication system (e.g., the communication system 108) to send the electronic message to the particular participant.

FIG. 12 shows another method (e.g., 1202) for facilitating interaction among meeting participants. In block 1204, the meeting system 102 causes a display device to display a user interface presentation (e.g., 402), the user interface presentation including: a first region (e.g., 404) for presenting first information, a second region (e.g., 406) for presenting second information, and a third region (e.g., 408) for presenting third information and a graphical control. The first information describes meetings that a particular user is scheduled to attend within a prescribed period of time. The second information describes participants of a particular meeting identified in the first information. The first information and the second information are obtained by querying a calendar data structure (e.g., 110) via a programmatic interface (e.g., 120). The third information includes a representation of a likelihood measure that specifies a likelihood that the particular meeting will take place, the likelihood measure being generated by processing logic based on the second information. The graphical control, upon activation, enables the particular user to take an action pertaining to the particular meeting. In some implementations, the graphical control is a prompt (e.g., 446) that invites the particular user to generate an electronic message to a particular participant of the particular meeting.

C. Representative Computing Functionality

Figure 13:
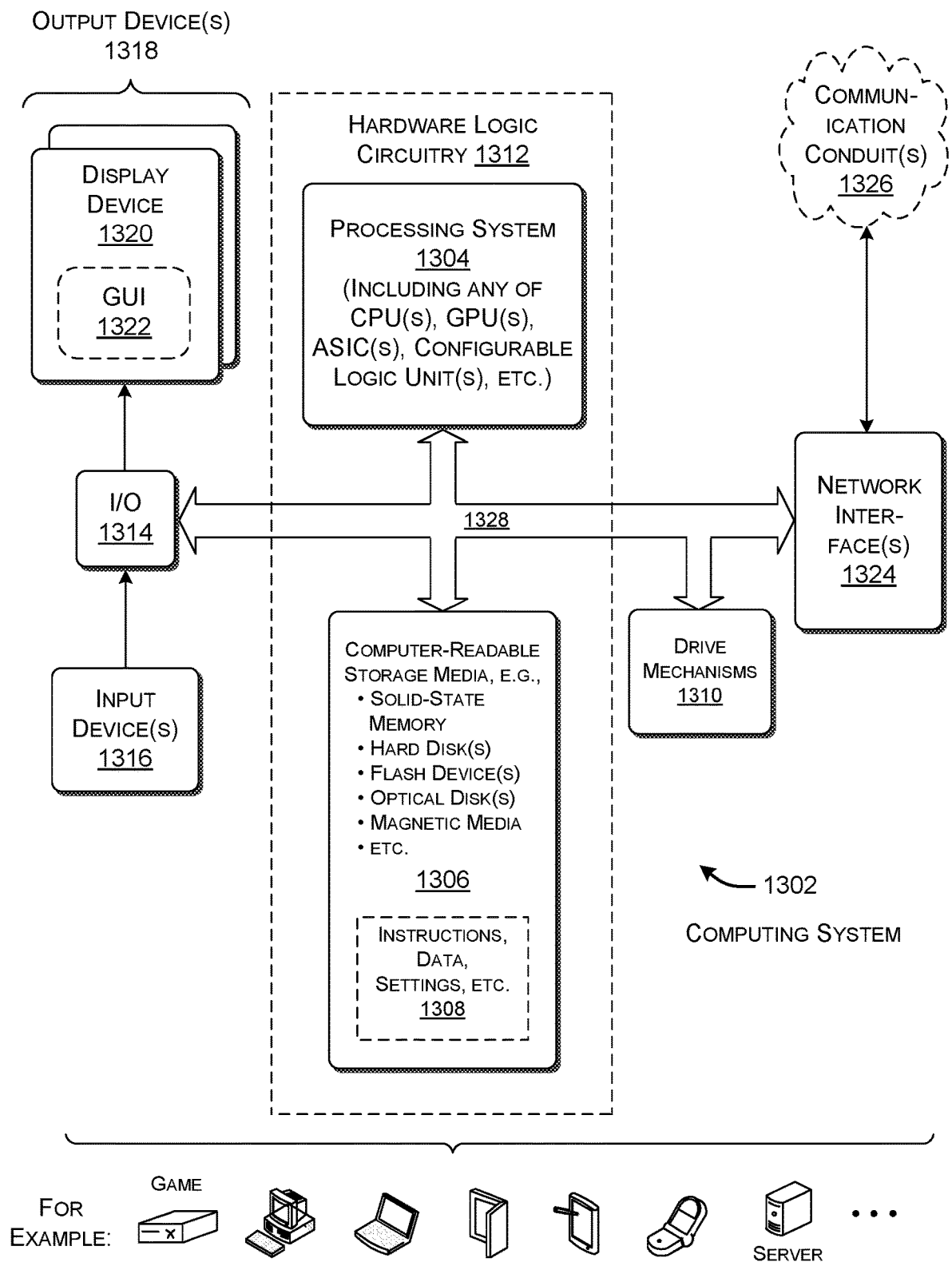
FIG. 13 shows an illustrative type of computing system that, in some implementations, is used to implement any aspect of the features shown in the foregoing drawings.

FIG. 13 shows a computing system 1302 that, in some implementations, is used to implement any aspect of the mechanisms set forth in the above-described figures. For instance, in some implementations, the type of computing system 1302 shown in FIG. 13 is used to implement any user computing device or any server shown in FIG. 2. In all cases, the computing system 1302 represents a physical and tangible processing mechanism.

The computing system 1302 includes a processing system 1304 including one or more processors. The processor(s) include one or more Central Processing Units (CPUs), and/or one or more Graphics Processing Units (GPUs), and/or one or more Application Specific Integrated Circuits (ASICs), and/or one or more Neural Processing Units (NPUs), etc. More generally, any processor corresponds to a general-purpose processing unit or an application-specific processor unit.

The computing system 1302 also includes computer-readable storage media 1306, corresponding to one or more computer-readable media hardware units. The computer-readable storage media 1306 retains any kind of information 1308, such as machine-readable instructions, settings, and/or data. For example, in some implementations, the computer-readable storage media 1306 includes one or more solid-state devices, one or more magnetic hard disks, one or more optical disks, magnetic tape, etc. Any instance of the computer-readable storage media 1306 uses any technology for storing and retrieving information. Further, any instance of the computer-readable storage media 1306 represents a fixed or removable unit of the computing system 1302. Further, any instance of the computer-readable storage media 1306 provides volatile and/or non-volatile retention of information.

More generally, any of the storage resources described herein, or any combination of the storage resources, is to be regarded as a computer-readable medium. In many cases, a computer-readable medium represents some form of physical and tangible entity. The term computer-readable medium also encompasses propagated signals, e.g., transmitted or received via a physical conduit and/or air or other wireless medium. However, the specific term "computer-readable storage medium" or "storage device" expressly excludes propagated signals per se in transit, while including all other forms of computer-readable media.

The computing system 1302 utilizes any instance of the computer-readable storage media 1306 in different ways. For example, in some implementations, any instance of the computer-readable storage media 1306 represents a hardware memory unit (such as Random Access Memory (RAM)) for storing information during execution of a program by the computing system 1302, and/or a hardware storage unit (such as a hard disk) for retaining/archiving information on a more permanent basis. In the latter case, the computing system 1302 also includes one or more drive mechanisms 1310 (such as a hard drive mechanism) for storing and retrieving information from an instance of the computer-readable storage media 1306.

In some implementations, the computing system 1302 performs any of the functions described above when the processing system 1304 executes computer-readable instructions stored in any instance of the computer-readable storage media 1306. For instance, in some implementations, the computing system 1302 carries out computer-readable instructions to perform each block of the processes described in Section B. FIG. 13 generally indicates that hardware logic circuitry 1312 includes any combination of the processing system 1304 and the computer-readable storage media 1306.

Alternatively, or in addition, the processing system 1304 includes one or more other configurable logic units that perform operations using a collection of logic gates. For instance, in some implementations, the processing system 1304 includes a fixed configuration of hardware logic gates, e.g., that are created and set at the time of manufacture, and thereafter unalterable. Alternatively, or in addition, the processing system 1304 includes a collection of programmable hardware logic gates that are set to perform different application-specific tasks. The latter category of devices includes, for example, Programmable Array Logic Devices (PALs), Generic Array Logic Devices (GALs), Complex Programmable Logic Devices (CPLDs), Field-Programmable Gate Arrays (FPGAs), etc. In these implementations, the processing system 1304 can also be said to incorporate a storage device that stores computer-readable instructions, insofar as the configurable logic units are configured to execute the instructions and therefore embody or store these instructions.

In some cases (e.g., in the case in which the computing system 1302 represents a user computing device), the computing system 1302 also includes an input/output interface 1314 for receiving various inputs (via input devices 1316), and for providing various outputs (via output devices 1318). Illustrative input devices include a keyboard device, a mouse input device, a touchscreen input device, a digitizing pad, one or more static image cameras, one or more video cameras, one or more depth camera systems, one or more microphones, a voice recognition mechanism, any position-determining devices (e.g., GPS devices), any movement detection mechanisms (e.g., accelerometers and/or gyroscopes), etc. In some implementations, one particular output mechanism includes a display device 1320 and an associated graphical user interface presentation (GUI) 1322. The display device 1320 corresponds to a liquid crystal display device, a light-emitting diode display (LED) device, a cathode ray tube device, a projection mechanism, etc. Other output devices include a printer, one or more speakers, a haptic output mechanism, an archival mechanism (for storing output information), etc. In some implementations, the computing system 1302 also includes one or more network interfaces 1324 for exchanging data with other devices via one or more communication conduits 1326. One or more communication buses 1328 communicatively couple the above-described units together.

The communication conduit(s) 1326 can be implemented in any manner, e.g., by a local area computer network, a wide area computer network (e.g., the Internet), point-to-point connections, or any combination thereof. The communication conduit(s) 1326 can include any combination of hardwired links, wireless links, routers, gateway functionality, name servers, etc., governed by any protocol or combination of protocols.

FIG. 13 shows the computing system 1302 as being composed of a discrete collection of separate units. In some cases, the collection of units corresponds to discrete hardware units provided in a computing device chassis having any form factor. FIG. 13 shows illustrative form factors in its bottom portion. In other cases, the computing system 1302 includes a hardware logic unit that integrates the functions of two or more of the units shown in FIG. 1. For instance, in some implementations, the computing system 1302 includes a system on a chip (SoC or SOC), corresponding to an integrated circuit that combines the functions of two or more of the units shown in FIG. 13.

The following summary provides a set of illustrative examples of the technology set forth herein.

(A1) According to a first aspect, some implementations of the technology described herein include a method (e.g., 1002) for facilitating interaction among meeting participants. The method includes: receiving (e.g., 1004) a triggering event; in response to the triggering event, using (e.g., 1006) a programmatic interface (e.g., 120) to query a data structure (e.g., 110) to discover first information regarding meetings that a particular user is scheduled to attend within a prescribed period of time; receiving (e.g., 1008) the first information and causing a display device (e.g., 1320) to present first information in a user interface presentation (e.g., 402); using (e.g., 1010) the programmatic interface to query the data structure to discover second information regarding participants of a particular meeting specified by the first information; receiving (e.g., 1012) the second information and causing the display device to present the second information in the user interface presentation; generating (e.g., 1014) a likelihood measure using processing logic, based on the second information, that specifies a likelihood that the particular meeting will take place; causing (e.g., 1102) the display device to present a representation of the likelihood measure in the user interface presentation; causing (e.g., 1104) the display device to present a graphical control in the user interface presentation; and in response to activation of the graphical control by the particular user, performing (e.g., 1106) a computer-implemented action pertaining to the particular meeting. Overall, the method is technically advantageous because it reduces the number of user interface actions that the particular user needs to perform to verify the attendance to an upcoming meeting. The method consumes less computing resources because it reduces the number of user interface actions (A2) According to some implementations of the method of A1, block 1104 involves generating (e.g., 1104') a prompt (e.g., 446) that invites the particular user to contact a particular participant of the particular meeting, and causing the display device to present a prompt in the user interface presentation. Block 1106 involves, in response to activation of the prompt by the particular user, automatically generating (e.g., 1106') an electronic message to the particular participant, and causing a communication system (e.g., 108) to send the electronic message to the particular participant.

(A3) According to some implementations of any of the methods of A1 or A2, the method further includes repeating the receiving the second information to the performing the computer-implemented action for another meeting specified by the first information, other than the particular meeting.

(A4) According to some implementations of any of the methods A1-A3, the second information includes: identity information that specifies an identity of each participant of the particular meeting; response information that specifies an indication of whether or not each participant of the particular meeting will attend the particular meeting; type information that specifies a degree to which each participant of the particular meeting is required to attend the particular meeting; and availability information that specifies whether each participant of the particular meeting is available to attend the particular meeting.

(A5) According to some implementations of any of the methods of A1-A4, the processing logic makes decisions based on a threshold value, wherein the threshold value is chosen based on whether or not a total number of the participants to the particular meeting is larger than a prescribed number.

(A6) According to some implementations of any of the methods of A1-A5, the processing logic includes a first processing path and a second processing path, and wherein the generating of the likelihood measure is configured to invoke the first processing path for a case in which an organizer of the particular meeting is available, and to invoke the second processing path for a case in which the organizer of the particular meeting is not available.

(A7) According to some implementations of any of the methods of A1-A6, the generating of the likelihood measure determines the likelihood measure based on a determination of a number of the participants of the particular meeting who have a prescribed status and who are available.

(A8) According to some implementations of the method of A7, the prescribed status indicates whether a given participant of the particular meeting has been identified as a required entity.

(A9) According to some implementations of any of the methods of A1-A8, the processing logic is a machine-trained model.

(A10) According to some implementations of any of the methods of A1-A9, the generating of the likelihood measure by the processing logic is performed in a first phase by using a set of explicit rules, and wherein the generating of the likelihood measure by the processing logic is performed in a second phase, after the first phase, by the machine-trained model, the machine-trained model being trained based on training examples, at least some of the training examples being generated based on feedback of users pertaining to output results generated in the first phase.

(A11) According to some implementations of any of the methods of A1-A10, the user interface presentation includes a first region for presenting the first information, a second region for presenting the second information, and a third region for presenting the representation of the likelihood measure and the graphical control.

(A12) According to some implementations of the method of A11, the third region of the user interface presentation also presents information that summarizes current availability of the participants of the particular meeting.

(A13) According to some implementations of any of the methods of A1-A12, the electronic message is an automatically-generated message that also summarizes the participants of the meeting that are available.

(A14) According to some implementations of any of the methods of A1-A13, the method further incudes automatically removing the particular meeting from a schedule of the particular user for a case in which the likelihood measure indicates that the likelihood measure fails to satisfy a prescribed threshold.

(A15) According to some implementations of any of the methods of A1-A14, the method further includes: automatically receiving scheduling event information and participant status information from at least one information source; and updating the data structure in response to the scheduling event information and the participant status information that are received.

(B1) According to a second aspect, some implementations of the technology described herein include a method (e.g., 1302) for facilitating interaction among meeting participants. The method includes causing (e.g., 1204) a display device (e.g., 1320) to display a user interface presentation (e.g. 402), the user interface presentation including: a first region (e.g., 404) for presenting first information, a second region (e.g., 406) for presenting second information, and a third region (e.g., 408) for presenting third information and a graphical control. The first information describes meetings that a particular user is scheduled to attend within a prescribed period of time. The second information describes participants of a particular meeting identified in the first information, wherein the first information and the second information have been obtained by querying a calendar data structure (e.g., 110) via a programmatic interface (e.g., 120). The third information includes a representation of a likelihood measure that specifies a likelihood that the particular meeting will take place, the likelihood measure being generated by processing logic based on second information. The graphical control (e.g., the prompt 446), upon activation, enables the particular user to take an action pertaining to the particular meeting (such as sending an electronic meeting to a particular participant of the particular meeting).

In yet another aspect, some implementations of the technology described herein include a computing system (e.g., the computing system 1302) that includes a processing system (e.g., the processing system 1304) having a processor. The computing system also includes a storage device (e.g., the computer-readable storage media 1306) for storing computer-readable instructions (e.g., information 1308) that, when executed by the processing system, perform any of the methods described herein (e.g., any of the methods of A1-A15 or B1).

In yet another aspect, some implementations of the technology described herein include a computer-readable storage medium (e.g., the computer-readable storage medium 1306) for storing computer-readable instructions (e.g., the information 1308). A processing system (e.g., the processing system 1304) executes the computer-readable instructions to perform any of the operations described herein (e.g., the operation in any of the methods of A1-A15 or B1).

More generally stated, any of the individual elements and steps described herein can be combined, for example, into any logically consistent permutation or subset. Further, any such combination can be manifested, for example, as a method, device, system, computer-readable storage medium, data structure, article of manufacture, graphical user interface presentation, etc. The technology can also be expressed as a series of means-plus-format elements in the claims, although this format should not be considered to be invoked unless the phase "means for" is explicitly used in the claims.

As to terminology used in this description, the phrase "configured to" encompasses various physical and tangible mechanisms for performing an identified operation. The mechanisms can be configured to perform an operation using the hardware logic circuitry 1312 of Section C. The term "logic" likewise encompasses various physical and tangible mechanisms for performing a task. For instance, each processing-related operation illustrated in the flowcharts of Section B corresponds to a logic component for performing that operation.

This description may have identified one or more features as "optional." This type of statement is not to be interpreted as an exhaustive indication of features that may be considered optional; that is, other features can be considered as optional, although not explicitly identified in the text. Further, any mention of a single entity is not intended to preclude the use of plural such entities; similarly, a description of plural entities in the specification is not intended to preclude the use of a single entity. As such, a statement that an apparatus or method has a feature X does not preclude the possibility that it has additional features. Further, while the description may explain certain features as alternative ways of carrying out identified functions or implementing identified mechanisms, the features can also be combined together in any combination. Further, the term "plurality" or "plural" or the plural form of any term (without explicit use of "plurality" or "plural") refers to two or more items, and does not necessarily imply "all" items of a particular kind, unless otherwise explicitly specified. The term "at least one of" refers to one or more items; reference to a single item, without explicit recitation of "at least one of," is not intended to preclude the inclusion of plural items, unless otherwise noted. Further, the descriptors "first," "second," "third," etc. are used to distinguish among different items, and do not imply an ordering among items, unless otherwise noted. The phrase "A and/or B" means A, or B, or A and B. Further, the terms "comprising," "including," and "having" are open-ended terms that are used to identify at least one part of a larger whole, but not necessarily all parts of the whole. A "set" can include zero members, one member, or more than one member. Finally, the terms "exemplary" or "illustrative" refer to one implementation among potentially many implementations.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, and/or password-protection mechanisms).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for facilitating interaction among meeting participants, comprising:
   receiving a triggering event;
   in response to the triggering event, using a programmatic interface to query a data structure to discover first information regarding meetings that a particular user is scheduled to attend within a prescribed period of time;
   receiving the first information and causing a display device to present the first information in a user interface presentation;
   using the programmatic interface to query the data structure to discover second information regarding participants who have been invited to a particular meeting specified by the first information;
   receiving the second information and causing the display device to present the second information in the user interface presentation;
   generating a likelihood measure using processing logic, based on the second information, that specifies a likelihood that the particular meeting will take place, the generating of the likelihood measure including making decisions based on only participants having a prescribed status of required for a case in which a total number of the participants who have been invited to the particular meeting is larger than a predetermined number, and the generating of the likelihood measure including making decisions based on all participants who have been invited to the particular meeting for a case in which the total number of participants is less than or equal to the predetermined number;
   causing the display device to present a representation of the likelihood measure in the user interface presentation;
   causing the display device to present a graphical control in the user interface presentation; and
   in response to activation of the graphical control, performing a computer-implemented action pertaining to the particular meeting.

2. The method of claim 1,
   wherein the causing the display device to present a graphical control includes generating a prompt that invites the particular user to contact a particular participant of the particular meeting, and causing the display device to display the prompt in the user interface presentation, and
   wherein the performing the computer-implemented action includes automatically generating an electronic message to the particular participant, and causing a communication system to send the electronic message to the particular participant.

3. The method of claim 1, further including repeating the receiving the second information to performing the computer-implemented action for another meeting specified by the first information, other than the particular meeting.

4. The method of claim 1, wherein the second information includes: identity information that specifies an identity of each participant of the particular meeting; response information that specifies an indication of whether or not each participant of the particular meeting will attend the particular meeting; type information that specifies a degree to which each participant of the particular meeting is required to attend the particular meeting; and availability information that specifies whether each participant of the particular meeting is available to attend the particular meeting.

5. The method of claim 1, wherein the processing logic includes a first processing path and a second processing path, and wherein the generating of the likelihood measure is configured to invoke the first processing path for a case in which an organizer of the particular meeting is available, and to invoke the second processing path for a case in which the organizer of the particular meeting is not available.

6. The method of claim 1, wherein the generating of the likelihood measure determines the likelihood measure based on a determination of a number of the participants of the particular meeting who are available.

7. The method of claim 1, wherein the processing logic is a machine-trained model.

8. The method of claim 1, wherein the user interface presentation includes a first region for presenting the first information, a second region for presenting the second information, and a third region for presenting the representation of the likelihood measure and the graphical control.

9. The method of claim 1, wherein the method further includes automatically receiving scheduling event information and participant status information from at least one information source, and updating the data structure in response to the scheduling event information and the participant status information that are received.

10. A method for facilitating interaction among meeting participants, comprising:
receiving a triggering event;
in response to the triggering event, using a programmatic interface to query a data structure to discover first information regarding meetings that a particular user is scheduled to attend within a prescribed period of time;
receiving the first information and causing a display device to present the first information in a user interface presentation;
using the programmatic interface to query the data structure to discover second information regarding participants of a particular meeting specified by the first information;
receiving the second information and causing the display device to present the second information in the user interface presentation;
generating a likelihood measure using processing logic, based on the second information, that specifies a likelihood that the particular meeting will take place;
causing the display device to present a representation of the likelihood measure in the user interface presentation;
causing the display device to present a graphical control in the user interface presentation; and
in response to activation of the graphical control, performing a computer-implemented action pertaining to the particular meeting,
wherein the generating of the likelihood measure is performed by the processing logic in a first phase by using a set of explicit rules, and wherein the generating of the likelihood measure is performed by the processing logic in a second phase, after the first phase, by a machine-trained model, the machine-trained model being trained based on training examples, at least some of the training examples being generated based on feedback of users pertaining to output results generated in the first phase.

11. A method for facilitating interaction among meeting participants, comprising:
receiving a triggering event;
in response to the triggering event, using a programmatic interface to query a data structure to discover first information regarding meetings that a particular user is scheduled to attend within a prescribed period of time;
receiving the first information and causing a display device to present the first information in a user interface presentation;
using the programmatic interface to query the data structure to discover second information regarding participants of a particular meeting specified by the first information;
receiving the second information and causing the display device to present the second information in the user interface presentation;
generating a likelihood measure using processing logic, based on the second information, that specifies a likelihood that the particular meeting will take place;
causing the display device to present a representation of the likelihood measure in the user interface presentation;
causing the display device to present a graphical control in the user interface presentation; and
in response to activation of the graphical control, performing a computer-implemented action pertaining to the particular meeting,
wherein the method further includes automatically removing the particular meeting from a schedule of the particular user for a case in which the likelihood measure indicates that the likelihood measure fails to satisfy a prescribed threshold.

12. A computing system for facilitating interaction among meeting participants, comprising:
a processing system comprising a processor; and
a storage device for storing machine-readable instructions that, when executed by the processing system, perform operations comprising:
causing a display device to display a user interface presentation, the user interface presentation including: regions for presenting first information, for presenting second information, and for presenting third information and a graphical control,
the first information describing meetings that a particular user is scheduled to attend within a prescribed period of time,
the second information describing participants of a particular meeting identified in the first information,
the first information and the second having been obtained by querying a calendar data structure via a programmatic interface, and
the third information including a representation of a likelihood measure that specifies a likelihood that the particular meeting will take place, the likelihood measure being generated by processing logic based on second information, and
the graphical control, upon activation, enabling an action to be taken pertaining to the particular meeting,
the regions including another graphical control, which, upon activation, causes removal of all meetings in the regions that have a prescribed likelihood measure.

13. The computing system of claim 12, wherein the graphical control that enables an action to be taken pertaining to the particular meeting is a prompt that invites the particular user to generate an electronic message to a particular participant of the particular meeting.

14. The computing system of claim 12, wherein the regions of the user interface presentation also presents information that summarizes current availability of the participants of the particular meeting.

15. The computing system of claim 12, wherein the prescribed likelihood measure is zero percent.

16. A computer-readable storage medium for storing computer-readable instructions, wherein a processing system executing the computer-readable instructions performs operations comprising:
receiving a triggering event;
in response to the triggering event, using a programmatic interface to query a data structure to discover first information regarding meetings that a particular user is scheduled to attend within a prescribed period of time;
receiving the first information and causing a display device to present the first information in a first region of a user interface presentation;
using the programmatic interface to query the data structure to discover second information regarding participants who have been invited to a particular meeting specified by the first information, the data structure storing the second information in response to automatically receiving scheduling event information and status information from at least one information source;

receiving the second information and causing the display device to present the second information in a second region of the user interface presentation;

generating a likelihood measure, based on the second information, that specifies a likelihood that the particular meeting will take place, wherein the generating of the likelihood measure invokes a first processing path for a case in which an organizer of the particular meeting is available, and invokes a second processing path for a case in which the organizer of the particular meeting is not available, tests in each of the first processing path and the second processing path being based on a determination of whether or not a total number of the participants who have been invited to the particular meeting is larger than a prescribed number;

causing the display device to present a representation of the likelihood measure in a third region of the user interface presentation;

generating a prompt that invites the particular user to contact a particular participant of the particular meeting, and causing the display device to present the prompt in the third region of the user interface presentation;

in response to activation of the prompt, automatically generating an electronic message to the particular participant; and causing a communication system to send the electronic message to the particular participant.

17. The computer-readable storage medium of claim 16, wherein the second information includes: identity information that specifies an identity of each participant of the particular meeting; response information that specifies an indication of whether or not each participant of the particular meeting will attend the particular meeting; type information that specifies a degree to which each participant of the particular meeting is required to attend the particular meeting; and availability information that specifies whether each participant of the particular meeting is available to attend the particular meeting.

18. The computer-readable storage medium of claim 16, wherein the third region of the user interface presentation also presents information that summarizes current availability of the participants of the particular meeting.

19. The computer-readable storage medium of claim 16, wherein the electronic message is an automatically-generated message that summarizes who among the participants of the particular meeting are available, and which includes a message that asks the particular participant whether the particular participant will attend the particular meeting.

20. The computer-readable storage medium of claim 16, wherein the processing logic makes decisions based on only participants having a prescribed status of required for a case in which a total number of the participants who have been invited to the particular meeting is larger than a predetermined number, and the processing logic makes decisions based on all participants who have been invited to the particular meeting for a case in which the total number of participants is less than or equal to the predetermined number.

* * * * *